(12) United States Patent
Li et al.

(10) Patent No.: US 7,627,037 B2
(45) Date of Patent: Dec. 1, 2009

(54) BARBELL LIFTING FOR MULTI-LAYER WAVELET CODING

(75) Inventors: Shipeng Li, Redmond, WA (US); Ruiqin Xiong, Beijing (CN); Lin Luo, Beijing (CN); Jizheng Xu, Beijing (CN); Feng Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1025 days.

(21) Appl. No.: 10/912,033

(22) Filed: Aug. 4, 2004

(65) Prior Publication Data

US 2005/0190979 A1 Sep. 1, 2005

Related U.S. Application Data

(60) Provisional application No. 60/548,768, filed on Feb. 27, 2004.

(51) Int. Cl.
*H04B 1/66* (2006.01)
*H04N 7/12* (2006.01)
*H04N 11/02* (2006.01)
*H04N 11/04* (2006.01)

(52) U.S. Cl. .............................. 375/240.19; 375/240.16
(58) Field of Classification Search ............. 375/240.19
See application file for complete search history.

(56) References Cited

U.S. PATENT DOCUMENTS

| 5,692,063 | A | 11/1997 | Lee et al. |
|---|---|---|---|
| 5,946,043 | A | 8/1999 | Lee et al. |
| 5,982,438 | A | 11/1999 | Lin et al. |
| 6,233,017 | B1 | 5/2001 | Chaddha |
| 6,404,814 | B1 | 6/2002 | Apostolopoulos et al. |
| 6,470,469 | B1 | 10/2002 | Chou et al. |
| 6,510,177 | B1 | 1/2003 | De Bonet et al. |
| 6,546,143 | B1 | 4/2003 | Taubman et al. |
| 6,597,739 | B1 | 7/2003 | Li et al. |
| 6,678,419 | B1 * | 1/2004 | Malvar ........................ 382/240 |
| 6,700,933 | B1 | 3/2004 | Wu et al. |
| 6,735,345 | B2 | 5/2004 | Lin et al. |

(Continued)

FOREIGN PATENT DOCUMENTS

| WO | WO2006006764 A1 | 1/2006 |
|---|---|---|
| WO | WO2006006778 A1 | 1/2006 |
| WO | WO2006059847 A1 | 6/2006 |

OTHER PUBLICATIONS

M.K Mandal Journal of Visual Communications and Image Representation 12, 17-28 (2001). Video Segmentation in the Wavelet Compressed Domain.*

(Continued)

*Primary Examiner*—Jessica Roberts
(74) *Attorney, Agent, or Firm*—Lee & Hayes, PLLC

(57) ABSTRACT

A method for coding video data includes scalably generating layers of wavelet coefficients based on a frame of video data, scalably generating motion vector data associated with the plurality of layers, and combining the motion vector data and the plurality of layers of wavelet coefficients into a coded video frame representing the frame of video data. The method may further include transmitting the coded video frame. A system for coding video data includes a temporal decomposition module scalably applying a barbell function to a frame of video data, and a motion vector module scalably coding motion vector data at multiple levels of refinement.

44 Claims, 20 Drawing Sheets

U.S. PATENT DOCUMENTS

| | | |
|---|---|---|
| 7,027,512 B2* | 4/2006 | Jeon ........................ 375/240.16 |
| 2003/0128760 A1* | 7/2003 | Lee et al. ................ 375/240.16 |
| 2003/0133500 A1* | 7/2003 | Auwera et al. ......... 375/240.11 |
| 2005/0047509 A1* | 3/2005 | Lee et al. ................ 375/240.19 |
| 2005/0117639 A1 | 6/2005 | Turaga et al. |
| 2005/0117647 A1* | 6/2005 | Han ........................ 375/240.16 |
| 2006/0012680 A1* | 1/2006 | Bourge ........................ 348/155 |
| 2007/0253487 A1* | 11/2007 | Kim et al. .............. 375/240.16 |

OTHER PUBLICATIONS

Lin Luo, Feng Wu, Shipeng Li and Zhenquan Zhuang, Layer-correlated Motion Estimation and Motion Vector Coding for the 3D-Wavelet Video Coding Aug. 2003, IEEE 2003.*

* cited by examiner

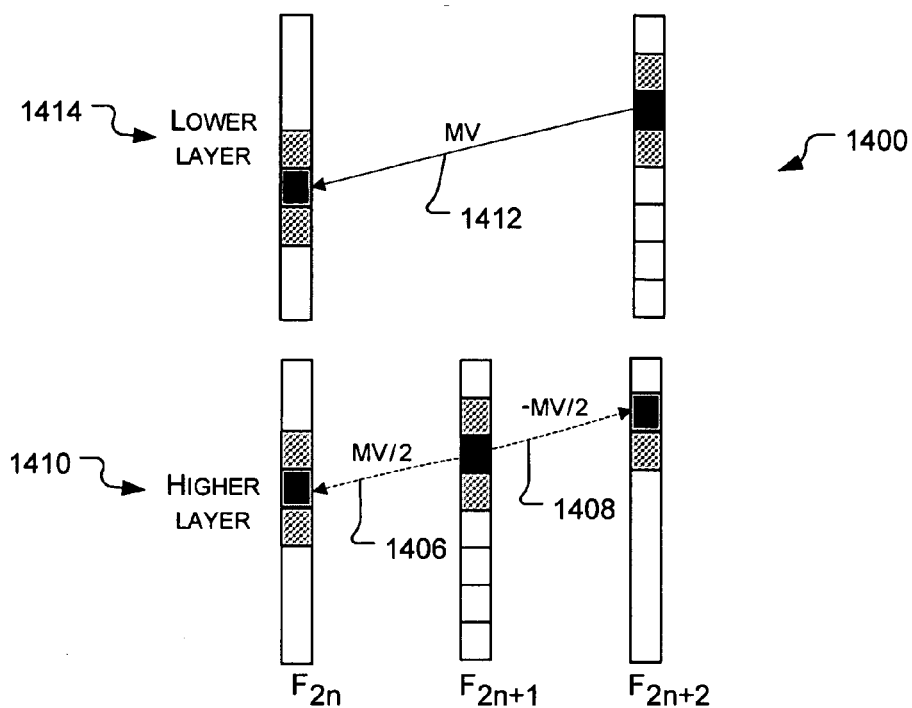
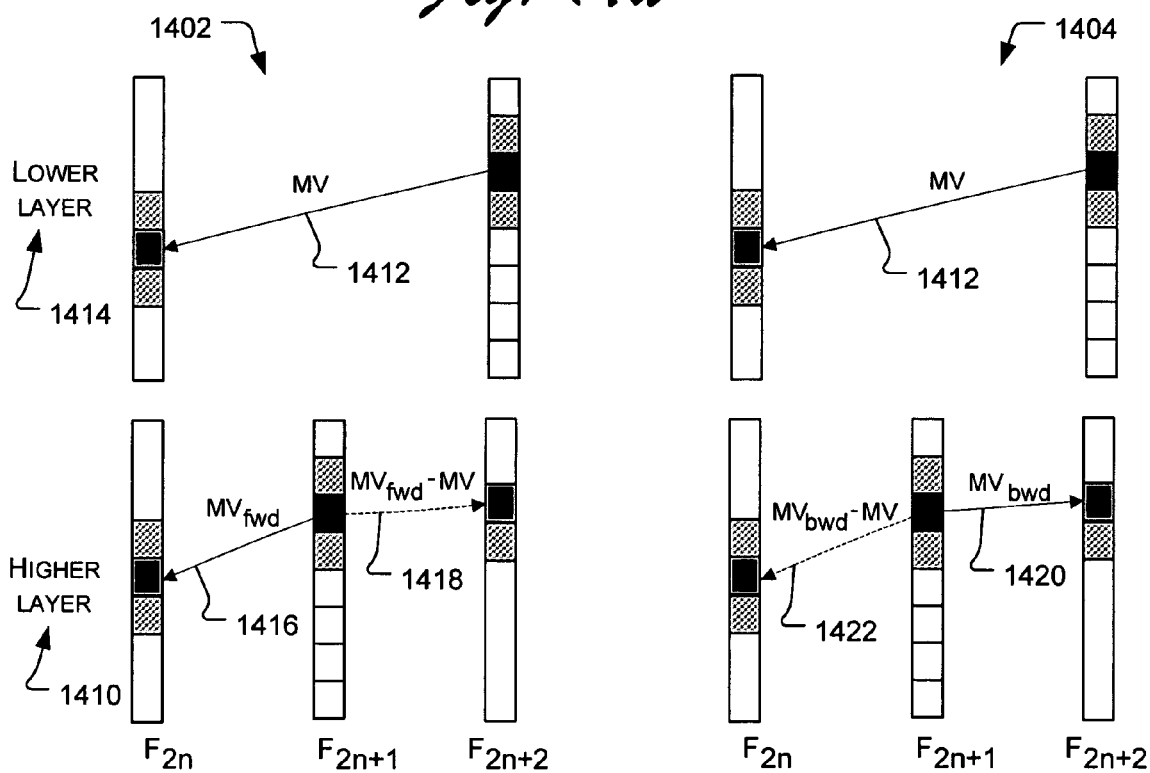
Fig. 14a
Fig. 14b

DirInv mode

Bid mode

BARBELL LIFTING FOR MULTI-LAYER WAVELET CODING

RELATED APPLICATIONS

This application claims priority to U.S. Provisional Application No. 60/548,768, filed Feb. 27, 2004.

TECHNICAL FIELD

The described subject matter relates to video encoding and decoding, and more particularly to Barbell lifting for multi-layer wavelet coding.

BACKGROUND

In the field of video coding, video images or frames can be coded into wavelet coefficients. Such wavelet encoding can offer good coding efficiency. Traditional approaches to wavelet coding involve applying a 1-dimensional (1-D) wavelet transformation to a video image to decompose the video data into the coefficients that represent the video image. The decomposing process is often referred to as lifting. The wavelet coefficients can be used by a video receiver to easily reconstruct the video image. Unfortunately, traditional approaches to wavelet coding have drawbacks, particularly with respect to motion video coding.

Some video coding standards, such as MPEG-4, employ motion compensation. Generally, motion compensation involves creating motion vectors that indicate how areas (called macroblocks) of frames in motion video move from one frame to another frame. By using motion vectors, redundancy between frames can be exploited to increase video compression. Using motion vector information, the video receiver can determine where pixels move from one frame to the next.

One problem that can arise when applying wavelet coding to motion aligned video is called over-complete wavelet compensation. Over-complete wavelet compensation occurs when motion vectors collide due to contractive motion. When motion vectors collide, multiple pixels in one frame may be mapped to one pixel in a subsequent frame. FIG. 1 is a graphical illustration 100 depicting over-complete wavelet compensation. 1-dimensional pixel arrays 102 are shown in a sequence of temporally-related frames 104. As shown, three motion vectors 106a, 106b, and 106c converge on a single pixel 108 in frame $F_2$. One possible solution to colliding motion vectors is to remove all but one of the colliding vectors. In FIG. 1, removal of motion vectors 106a and 106c is illustrated with an 'X' 110 over motion vector 106a and an 'X' 112 over motion vector 106c. However, this solution results in significant reduction of coding efficiency due to the wavelet boundary effect.

Another problem that can occur when wavelet coding motion video relates to fractional pixel (or sub-pixel) precision. Traditionally, when a motion vector indicates that a pixel of one frame has moved between two pixel positions of a subsequent frame, the pixel position is set to one or the other of the two pixel positions in the subsequent frame. In other words, the fractional pixel position motion vector is forced to an integer pixel position. Inaccuracy related to fractional pixels is illustrated in FIG. 1. A motion vector 114 (shown with a dotted line) originally points between two pixel position 116 and pixel position 118. The motion vector 114 is adjusted to a new motion vector 120 that points to pixel position 116. If, in forcing a sub-pixel to an integer pixel position, over-complete wavelet compensation occurs, the sub-pixel may be forced to a different, less accurate integer pixel position. As a result, coding accuracy and efficiency may be reduced.

Accordingly, although wavelet coding of images can be beneficial to improve coding efficiency, traditional approaches to wavelet coding has certain drawbacks when applied to motion video.

SUMMARY

Implementations relate to Barbell lifting for wavelet-based video coding to address the aforementioned problems, as well as other problems. Barbell lifting involves applying a wavelet transform in a predictive stage to generate high-pass coefficients and in an update stage to generate low-pass coefficients. The wavelet transform includes functions of sets of pixels in adjacent frames to generate wavelet coefficients. Barbell lifting is scalably applied to multiple layers of video in a frame of video data. Motion vector data is scalably coded and combined with the barbell lifted video layers.

BRIEF DESCRIPTION OF THE DRAWINGS

FIGS. 14a-14b illustrates exemplary inter-layer motion vector coding schemes that may be used to scalably code motion vector information.

DESCRIPTION

Exemplary Video Coding System

Figure 1:
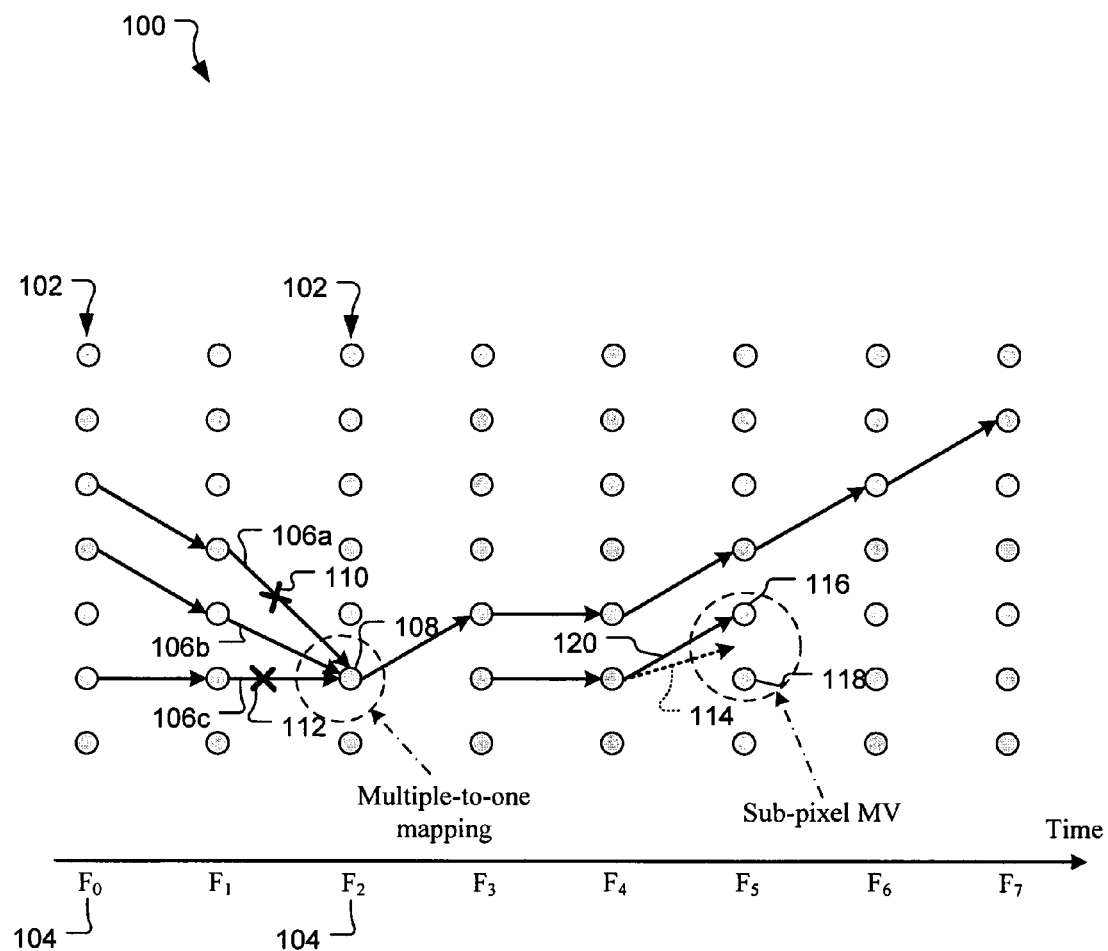
FIG. 1 is a graphical illustration of multiple-to-one pixel mapping and fractional pixel mapping that can occur in wavelet coded motion-compensated video.
Figure 2:
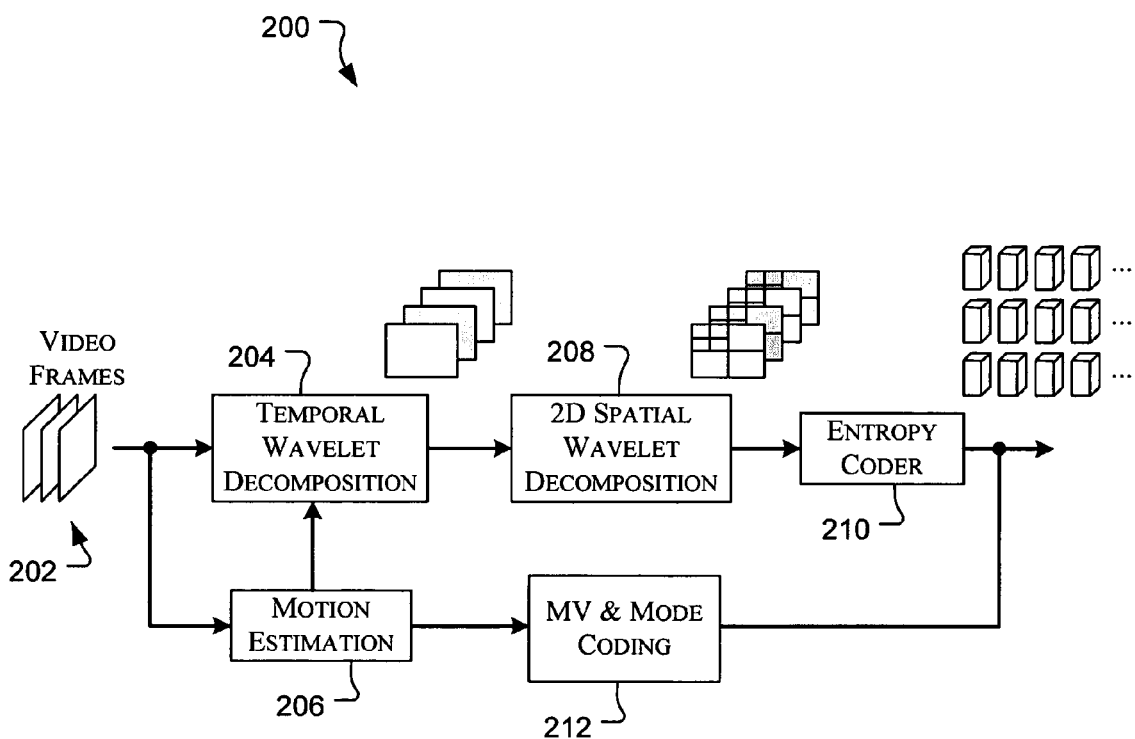
FIG. 2 illustrates an exemplary video coder employing temporal wavelet decomposition, wherein Barbell lifting is applied with motion alignment.

FIG. 2 illustrates an exemplary video coder 200 employing Barbell functions for coding video data using motion alignment 3-dimensional wavelet coding. The video coder 200 exploits temporal and spatial correlation among input video frames 202 using wavelet decomposition. The video coder 200 also employs motion estimation for estimating motion of pixels across the frames 202.

Initially, the video frames 202 are input into a temporal wavelet decomposition module 204 and a motion estimation module 206. The temporal wavelet decomposition module 204 decomposes pixels in the video frames 202 into wavelet coefficients that represent the video frames 202. The temporal wavelet decomposition module 204 employs a wavelet transform, which performs a wavelet lifting process. The wavelet coefficients include low-pass and high-pass coefficients, which are described in further detail below. The output of the temporal wavelet decomposition module 204 includes frames of wavelet coefficients. The frames output from the temporal wavelet decomposition module 204 alternate between a frame of low-pass coefficients and a frame of high-pass coefficients.

The motion estimation module 206 uses pixel information from the input frames 202 to perform motion alignment. In MPEG-4, for example, the frames 202 are each composed of macroblocks. A macroblock is a region in the frames 202 used for motion alignment. For example, in some standards, each macroblock consists of a 16×16 array of pixels. The motion estimation module 206 generates motion vector(s) that represent the horizontal and vertical displacement from the macroblock being encoded to the matching macroblock-sized area in a reference frame.

The motion vector(s) from the motion estimation module 206 can be used by the temporal decomposition module 204 to generate the wavelet coefficients. Because the motion alignment is performed during the temporal wavelet decomposition, the temporal wavelet decomposition module 204 can effectively form high energy compactions using the motion alignment information.

The frames output by the temporal wavelet decomposition module 204 are input into a 2-dimensional (2-D) spatial wavelet decomposition module 208. The spatial wavelet decomposition module 208 takes advantage of spatial correlation of pixels within a frame. The spatial wavelet decomposition module 208 decomposes each input frame into wavelet coefficients in both the vertical and the horizontal dimensions. The temporal wavelet decomposition module 204 and the 2-D spatial wavelet decomposition module 208 use discrete wavelet transforms (DWTs) to generate wavelet coefficients.

An entropy coder 210 provides for further compression of the video data prior to transmission. The entropy coder 210 assigns codes to symbols in the frames output by the spatial decomposition module 208 so as the match code lengths with the probabilities of the symbols. Typically, the entropy coder 210 assigns the most common symbols to the shortest codes using an algorithm. Exemplary entropy coding algorithms include Fibonacci coding, Golomb coding, Rice coding, Huffman coding, or Range coding.

A motion vector (MV) and mode coding module 212 code MV information and mode information into the signal that is transmitted. Mode information describes the predicted direction and/or partition of a portion of a video frame. The predicted direction is based on whether the portion of the frame is predicted from a previous reference, a future reference or both. Partition indicates whether the portion of the frame is partitioned into multiple sub-portions, wherein each sub-portion has a motion vector. Exemplary motion vector coding modes are described in more detail below.

A video decoder (not shown) that receives the transmitted signal uses the entropy coded, wavelet decomposed frames, and the MV and mode information to reconstruct the video frames. Generally, reconstruction of the video frames includes the reverse of the processes employed by the video coder 200.

The video coder 200 may be implemented in software, firmware, and/or hardware. The video coder 200 may be constructed as part of a general purpose computer (e.g., the computing device shown in FIG. 20) or special purpose computer (e.g., an embedded system), where the video code can be incorporated into an operating system or other application programs. Various exemplary implementations of processes employed by the video coder 220 are illustrated and described in further detail below with regard to the following figures.

Figure 3:
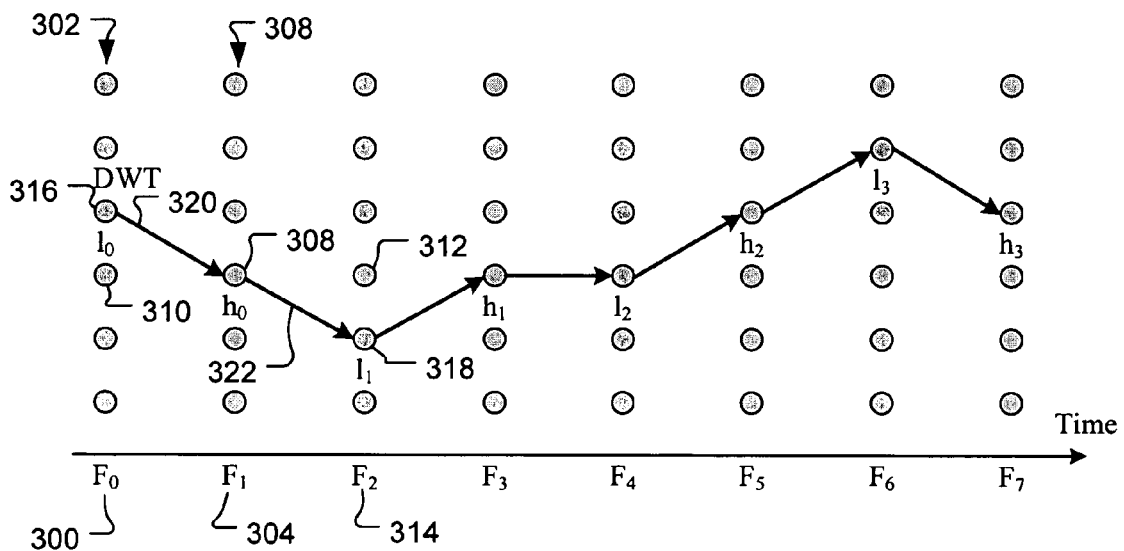
FIG. 3 is a graphical illustration of motion aligned wavelet coefficients in a sequence of video frames.

FIG. 3 graphically illustrates motion alignment with temporal wavelet decomposition. In an actual implementation, a decomposed frame of video is a 2-Dimensional (2-D) wavelet coefficient array. The systems and operations described herein can be applied to 2-D arrays of any size. However, for ease of illustration, each frame in a sequence of video frames is shown in FIG. 3 as a one-dimensional (1-D) wavelet coefficient array. The frames alternate between a low-pass frame and a high-pass frame. For example, frame $F_0$ 300 includes an array 302 of low-pass coefficients, frame $F_1$ 304 includes an array 306 of high-pass coefficients, and so on. $l_0, l_1, \ldots, l_3$ in FIG. 3 denotes the low-pass coefficients after wavelet decomposition and $h_0, h_1, \ldots, h_3$ denotes the high-pass coefficients.

The coefficients are not necessarily determined by coefficients at the same location of adjacent frames. For example, high-pass coefficient $h_0$ 308 in $F_1$ 304 is not calculated from the collocated coefficients 310 and 312 in $F_0$ 300 and $F_2$ 314, respectively. Instead, after motion alignment, coefficient $h_0$ 308 is decomposed as a high-pass coefficient based on coefficients 316 and 318 of $F_0$ 300 and $F_2$ 314 specified by backward motion vector (MV) 320 and forward MV 322, respectively. Other coefficients are processed in a similar fashion.

Figure 4:
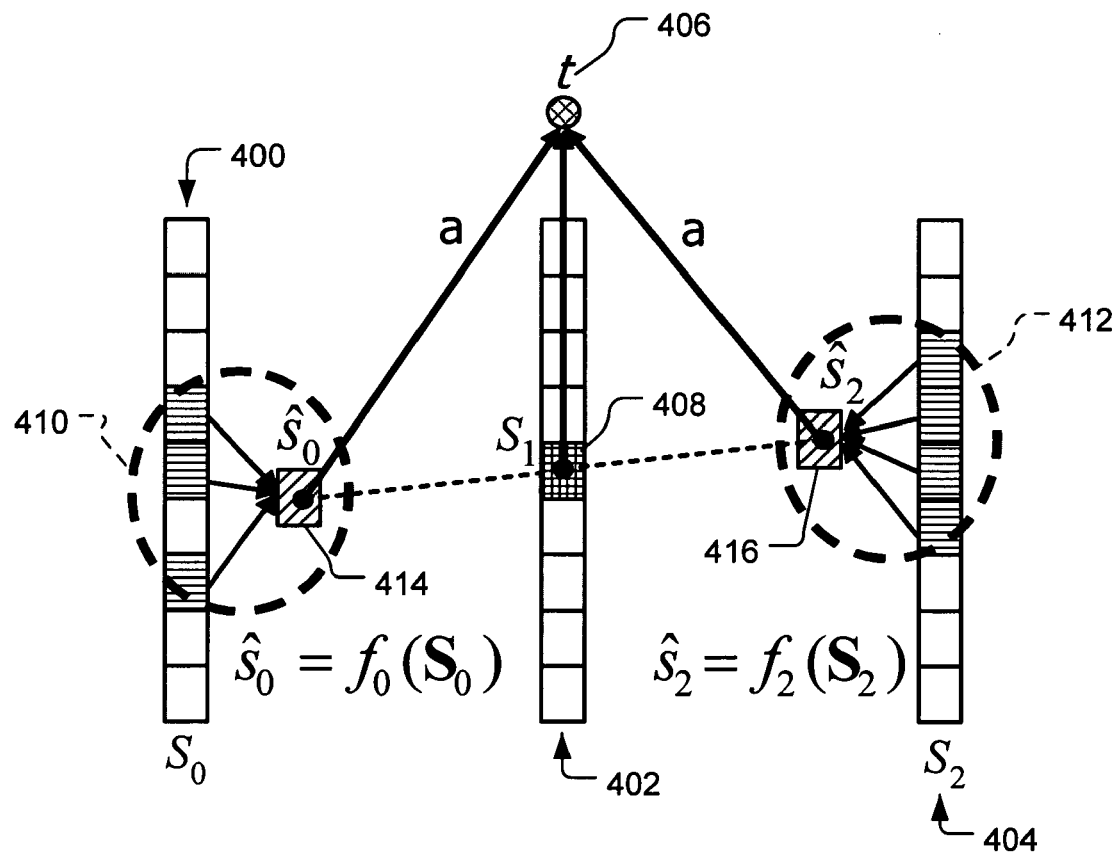
FIG. 4 illustrates an wavelet coding scheme with Barbell lifting wherein a wavelet coefficient is generated for a current frame based on multiple pixels from adjacent frames.

FIG. 4 graphically illustrates a wavelet coding scheme with Barbell lifting for coding video data. The coding scheme illustrated in FIG. 4 can be carried out by the temporal wavelet decomposition module 204 (FIG. 2). For an n-dimensional (i.e., multi-dimensional) signal, such as video and images, the scheme illustrated in FIG. 4 provides for efficient 1-D wavelet decomposition by taking one or more pixels from adjacent frames. Therefore, the wavelet lifting scheme is referred to herein as 'barbell lifting'.

FIG. 4 illustrates three one-dimensional pixel arrays to which Barbell lifting can be applied: a first pixel array 400, a second pixel array 402, and a third pixel array 404. The first pixel array 400 and the third pixel array 404 are in frames of video that are temporally adjacent to a frame that includes the second pixel array 402. A wavelet coefficient 406, labeled 't', is generated that corresponds to a pixel 408, labeled $S_1$, in the second pixel array 402.

In one implementation of Barbell lifting pixel $s_1$, and a barbell function of pixels from the first pixel array 400 and the second pixel array 404, are used to generate the coefficient t 406. To illustrate, a first group of pixels 410, labeled $S_0$, is shown with hatch lines in the first pixel array 400. A second group of pixels 412, labeled $S_2$, is shown with hatch lines in the second pixel array 404. In a special case, either or both of the groups 410 and 412 do not include any pixels. In other cases, groups 410 and 412 include one or more pixels.

The pixels in the first group 410 are combined to create another pixel, referred to herein as a combopixel 414, labeled $\hat{s}_0$. Similarly, the pixels in the second group 412 are combined to create another combopixel 416, labeled $\hat{s}_2$. Combopixel $\hat{s}_0$ 414 is derived according to a function of the pixels in the first group 410. As illustrated, the function used to derive combopixel $\hat{s}_0$ 414 is $f_0(S_0)$. The function used to derive combopixel $\hat{s}_2$ 416 is $f_2(S_2)$.

Functions $f_0(S_0)$ and $f_2(S_2)$ are called barbell functions. Functions $f_0(S_0)$ and $f_2(S_2)$ can be any linear or non-linear functions that operate on any pixels in the associated frames. A barbell function, such as $f_0(S_0)$, can also vary from pixel to pixel within a frame.

The wavelet coefficient 406 is computed in the barbell lifting process in accordance with a discrete wavelet transform. Accordingly, the barbell lifting process is formulated with the general function shown in equation (1):

$$t = a \times \hat{s}_0 + s_1 + b \times \hat{s}_2 \qquad (1)$$

The values 'a' and 'b' are the filtering parameters of wavelet transform. The values 'a' and 'b' may or may not be equal. Typically, the barbell lifting process is applied in two stages. The first stage, called a prediction stage, generates high-pass coefficients and the second stage, called and update stage, generates low-pass coefficients.

To illustrate barbell lifting further, a specific example is described with reference to FIGS. 5-8. The example illustrates both the wavelet transform and inverse wavelet transform. In FIGS. 5-8, a pixel is denoted by letter 'x', a 1-D array of pixels is denoted by letter 'X', a low-pass coefficient is denoted by letter 'l', a 1-D array of low-pass coefficients is denoted by letter 'L', a high-pass coefficient is denoted by 'h', and a 1-D array of high-pass coefficients is denoted by letter 'H'. Although the example illustrates only 1-D pixel and coefficient arrays, it is to be understood that the barbell lifting process is typically applied across an entire 2-D frame to generate a frame of coefficients.

Figure 5:
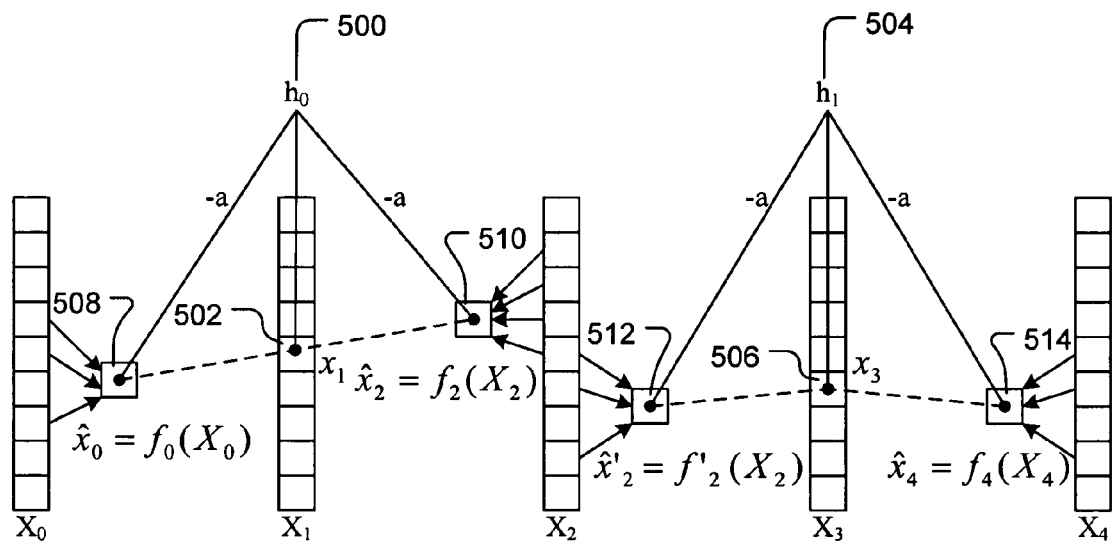
FIG. 5 illustrates an example of high-pass wavelet coefficient generation using Barbell lifting in a prediction stage.

First, as shown in FIG. 5, the prediction stage takes original input video frames to generate high-pass frames. Each of the 1-D pixel arrays, $X_0, X_1 \ldots, X_4$, is an array from a corresponding frame in a sequence of frames. In the prediction stage, high-pass frames are generated for each pixel in every other frame. Thus, a high-pass coefficient $h_0$ 500 is generated that corresponds to pixel $x_1$ 502 in array $X_1$, and another high-pass coefficient $h_1$ 504 is generated that corresponds to pixel $x_3$ 506 in array $X_3$.

The high-pass coefficient $h_0$ 500 is a wavelet transform of a combopixel $\hat{x}_0$ 508 from the previous frame and combopixel $\hat{x}_2$ 510 from the subsequent frame. As shown, combopixel $\hat{x}_0$ 508 is computed from a barbell function, $f_0(X_0)$, which is a function of a group of pixels in the 1-D array $X_0$. Also as shown, combopixel $\hat{x}_2$ 510 is computed from a barbell function, $f_2(X_2)$, which is a function of a group of pixels in the 1-D array $X_2$.

A similar process is used to compute high-pass coefficient $h_1$ 504. High-pass coefficient $h_1$ 504 is a function of combopixel $\hat{x}'_2$ 512 from the previous adjacent frame and combopixel $\hat{x}_4$ 514 from the subsequent adjacent frame. As shown, combopixel $\hat{x}'_2$ 512 is computed from a barbell function, $f'_2(X_2)$, which is a function of a group of pixels in the 1-D array $X_2$. Also as shown, combopixel $\hat{x}_4$ 514 is computed from a barbell function, $f_4(X_4)$, which is a function of a group of pixels in the 1-D array $X_3$. It is important to note that the group of pixels used in barbell function $f_2(X_2)$ can be different from the group of pixels used in the barbell function $f'_2(X_2)$.

A 1-D high-pass coefficient array, $H_0$, is generated by creating a high-pass coefficient for each pixel in pixel array $X_1$. High-pass coefficient array $H_0$ can be represented by $[h_{00}, h_{01}, \ldots, h_{0n}]$. Another 1-D high-pass coefficient array, $H_1$, is generated by creating a high-pass coefficient for each pixel in pixel array $X_3$. High-pass coefficient array $H_1$ can be represented by $[h_{00}, h_{11}, \ldots, h_{1n}]$. The high-pass coefficients are used in the update stage to generate low-pass coefficient arrays. An exemplary update stage is described with respect to FIG. 6.

Figure 6:
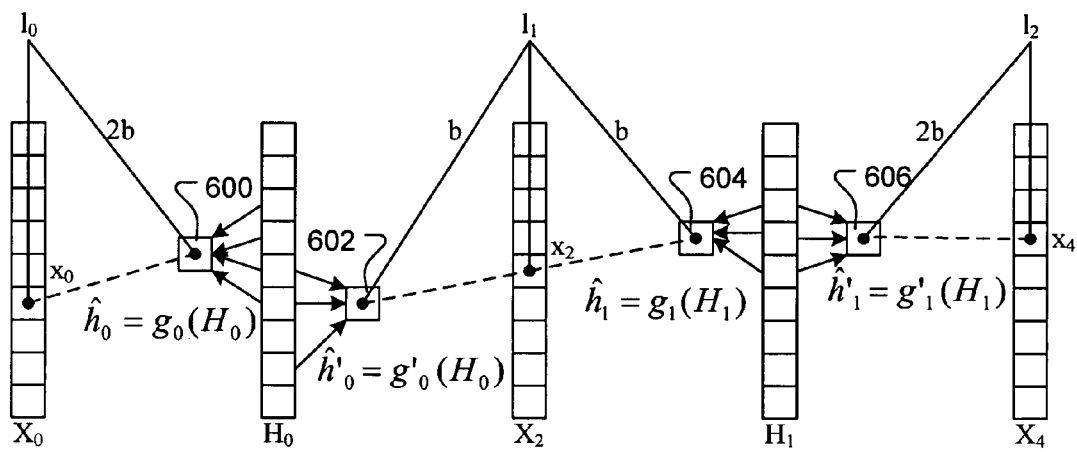
FIG. 6 illustrates an example of low-pass wavelet coefficient generation using Barbell lifting in an update stage.

FIG. 6 illustrates 1-D pixel frames $X_0$, $X_3$, and $X_4$, as in FIG. 5. However, 1-D high-pass array $H_0$ and 1-D high-pass array $H_1$ are shown in place of 1-D pixel array $X_1$ and 1-D pixel array $X_3$, respectively. 1-D low-pass coefficient arrays $L_0$, $L_1$, and $L_2$ are generated for 1-D pixel frames $X_0$, $X_2$, and $X_4$, respectively.

As illustrated in FIG. 6, a low-pass coefficient, $l_0$, corresponding to pixel $x_0$ is based on the pixel $x_0$ and a group of high-pass coefficients from the 1-D high-pass coefficient array $H_0$. The group of high-pass coefficients are combined to form a value $\hat{h}_0$, referred to herein as a combo-coefficient 600. The combo-coefficient is derived from function $g_0(H_0)$, which operates on the group of high-pass coefficients from 1-D coefficient array $H_0$. Low-pass coefficient, $l_0$, can be derived from the following wavelet transform:

$$l_0 = x_0 + 2b \times \hat{h}_0 \qquad (2)$$

Low-pass coefficient array $L_1$ is derived in a similar fashion, using groups of high-pass coefficients from high-pass coefficient array $H_0$ and high-pass coefficient array $H_1$, as well as the pixels in pixel array $X_2$. For example, a combo-coefficient $\hat{h}'_0$ 602 is computed from barbell function $g'_0(H_0)$, and combo-coefficient $\hat{h}_1$ 604 is computed from barbell function $g_1(H_1)$. The low-pass coefficient $l_1$ can be specified by wavelet transform (3):

$$l_1 = b \times \hat{h}'_0 + x_2 + b \times \hat{h}_1 \qquad (3)$$

A similar process is used to generate low-pass coefficients in low-pass coefficient array $L_2$ using a high-pass combo-coefficient $\hat{h}'_1$ 606 and pixel $x_4$. As shown, combo-coefficient $\hat{h}'_1$ 606 is the result of function $g'_1(H_1)$.

Figure 7:
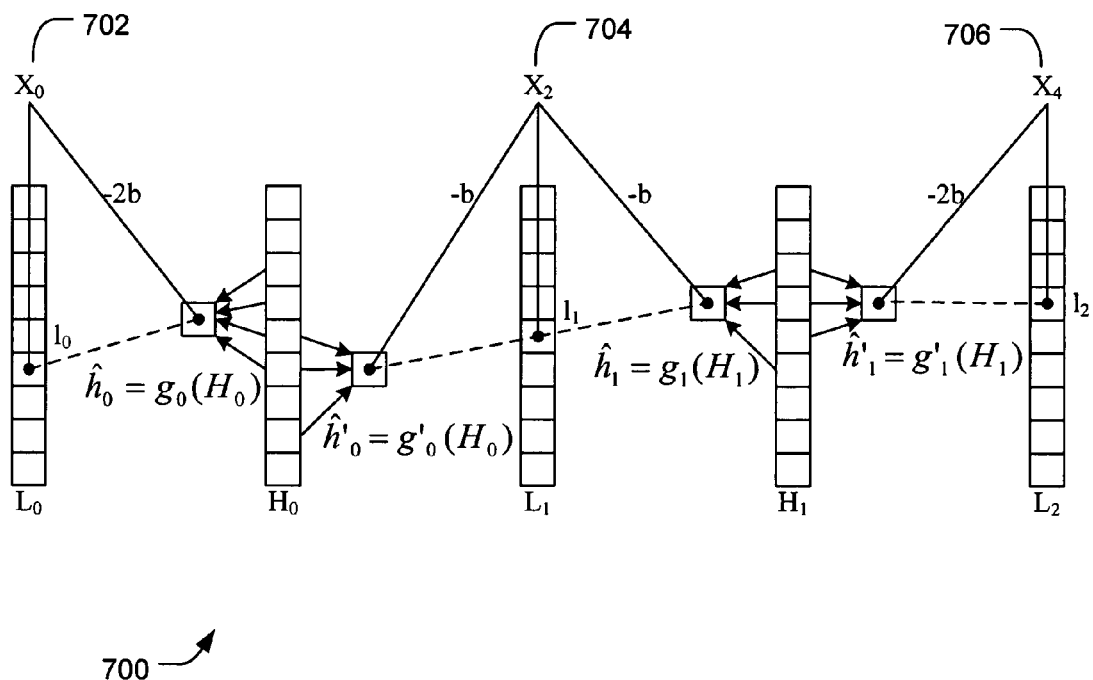
FIG. 7 illustrates an exemplary decoding process wherein frames of high-pass and low-pass wavelet coefficients are decoded to yield even frames of decoded pixels.
Figure 8:
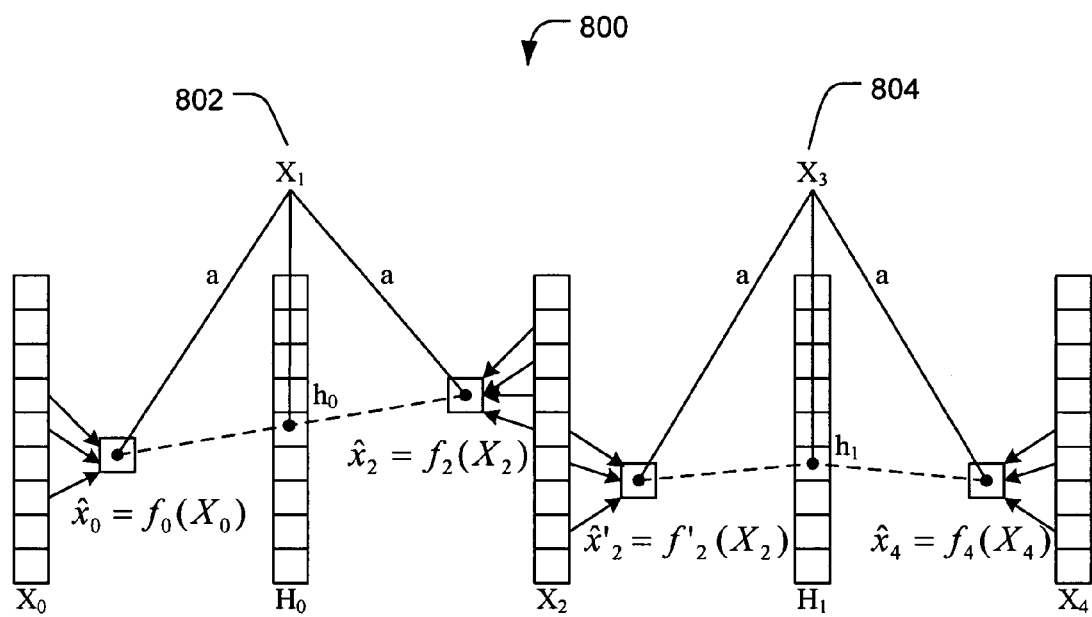
FIG. 8 illustrates an exemplary decoding process wherein the even frames of decoded pixels and the frames of high-pass wavelet coefficients are decoded to yield odd frames of decoded pixels.

After the prediction stage creates frames of high-pass coefficients and the update stage creates frames of low-pass coefficients, the high-pass and low-pass coefficient frames are transmitted to a video receiver. The video receiver uses a decoder to decode the wavelet coefficient data. The process of decoding is typically an inverse process. FIGS. 7-8 illustrate the inverse of the barbell lifting process.

For the inverse transform, as long as the original barbell functions used at the update stage are known, the even frames can be recovered first with available high-pass and low-pass frames as shown in FIG. 7. If the barbell functions at the prediction stage are known, the odd frames can be reconstructed with the available even frames and high-pass frames as shown in FIG. 8.

Referring specifically to FIG. 7, a sequence 700 of coded 1-D coefficient arrays $L_0$, $H_0$, $L_1$, $H_1$, and $L_2$ are used to generate decoded video arrays. In a first step of the decoding process, 1-D pixel arrays $X_0$ (702), $X_2$ (704), and $X_4$ (706) corresponding to even numbered video frames are generated. Thus, as shown 1-D pixel arrays $X_0$ (702), $X_2$ (704), and $X_4$ correspond to low-pass coefficient arrays $L_0$, $L_1$, and $L_2$, respectively. The process of generating 1-D pixel arrays $X_0$ (702), $X_2$ (704), and $X_4$ (706) is substantially inverse of the process illustrated in FIG. 6. Generally, a pixel in one of the pixel arrays $X_0$ (702), $X_2$ (704), and $X_4$ (706) is generated from an inverse wavelet transform of a combination of high-pass coefficient in an adjacent array, and a low-pass coefficient in the corresponding low-pass coefficient array.

For example, as shown, pixels in the pixel array X0 (702) is a combination of a low-pass coefficient, $l_0$, from coefficient array $L_0$ and high-pass coefficients from coefficient array $H_0$. Generating a pixel, $x_0$, in 1-D array $X_0$ can be generalized by equation (4) below:

$$x_0 = l_0 + (-2b) \times \hat{h}_0 \tag{4}$$

In equation (4), the value $\hat{h}_0$ is equal to function $g_0(H_0)$, which is a barbell function of one or more coefficients in coefficient array $H_0$. Pixels in pixel arrays $X_2$ (704) and $X_4$ (706) are generated in a similar manner to complete the pixel arrays. In this manner, the even video frames are generated by the decoder.

Referring to FIG. 8, there is shown a process 800 for generating the odd numbered video frames by decoding the remaining wavelet coded frames. The previously generated even numbered 1-D pixel arrays $X_0$, $X_2$, and $X_4$ are shown adjacent the high-pass coefficient arrays $H_0$ and $H_1$. Pixel arrays $X_1$ (802) and $X_3$ (804) correspond to odd numbered video frames and the high-pass coefficient arrays $H_0$ and $H_1$. Each pixel in the arrays $X_1$ (802) and $X_3$ (804) are generated by applying an inverse wavelet transform to a combination of pixels in adjacent decoded pixel arrays (e.g., pixel array $X_0$, $X_2$, or $X_4$) and a corresponding high-pass coefficient.

For example, a pixel, $x_1$, in array $X_1$ (802) is generated from a combination of pixels in array $X_0$, a combination of pixels in $X_2$, and high-pass coefficient $h_0$ in array $H_0$. A wavelet transform that describes pixel $x_1$ is given in equation (5) below:

$$x_1 = a \times x_0 + h_0 + a \times x_2 \tag{5}$$

In equation (5), the value $\hat{x}_0$ is equal to function $f_0(X_0)$, which is a function of one or more pixels in array $X_0$. The value $\hat{x}_2$ is equal to function $f_2(X_2)$, which is a function of one or more pixels in array $X_2$. The pixel array $X_3$ (804) can be generated in a similar fashion. Using the decoding scheme shown in FIG. 8, the odd frames of the video can be generated.

Exemplary Barbell Functions

Barbell function can be any arbitrary functions. However, some barbell functions are more efficient for temporal decomposition. When choosing a barbell function, the high-pass coefficients are preferably close to zero for efficient energy packing. The low-pass coefficients are preferably free from ghosting artifacts for temporal scalability and subsequent spatial decomposition. The barbell function preferably follows the motion trajectory for efficient decomposition and efficient coding of the barbell functions. The barbell functions are preferably consistent in the prediction and update stages. Preferably the decomposition efficiency and the side information are balanced. Lastly, a barbell function is preferably able to distribute quantization errors among many coefficients, instead of accumulating the errors to only a few coefficients. The foregoing guidelines are only suggestions and are not required in designing barbell functions.

Figure 9:
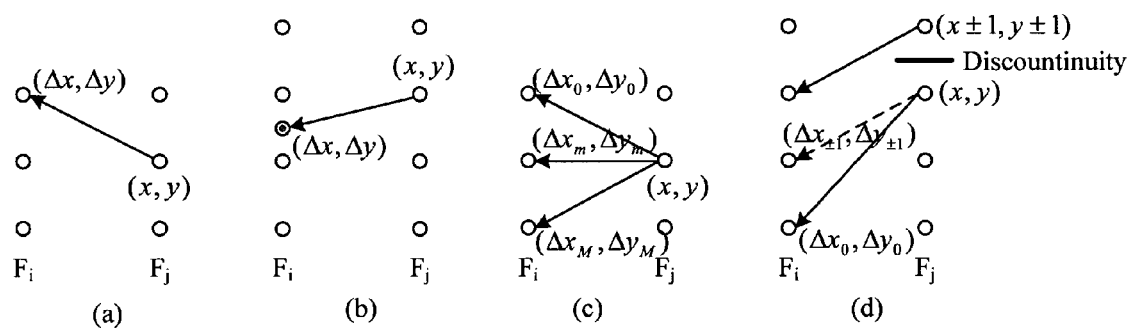
FIG. 9 illustrates four scenarios involving motion alignment and motion prediction when motion vectors are used in conjunction with barbell functions.

According to the above principles, many motion prediction. techniques can be used to form efficient barbell functions. FIG. 9 illustrates some example scenarios in which barbell functions can be effectively used with motion vectors in the prediction stage. An integer motion alignment scenario is shown in FIG. 9(a). An exemplary barbell function associated with the integer motion alignment scenario is given as follows:

$$f = F_i(x + \Delta x, y + \Delta y) \tag{6}$$

In equation (6), $(\Delta x, \Delta y)$ represents the motion vector of a current pixel (x, y). The symbol $F_i$ denotes the previous frame and symbol $F_j$ denotes the current frame.

A fractional-pixel motion alignment scenario is shown in FIG. 9(b). An exemplary barbell function for the fractional-pixel motion alignment scenario is shown in equation (7):

$$f = \sum_m \sum_n \alpha(m,n) F_i(x + \lfloor \Delta x \rfloor + m, y + \lfloor \Delta y \rfloor + n) \tag{7}$$

In equation (7), the symbol $\lfloor \ \rfloor$ denotes the integer part of $\Delta x$ and $\Delta y$. The barbell function specified in equation (7) yields a fractional pixel value calculated from neighboring pixels at integer pixel positions using an interpolation filter. The value $\alpha(m,n)$ is a factor of the interpolation filter at each pixel identified by indices m and n.

A multiple-to-one pixel mapping scenario is shown as in FIG. 9(c). An exemplary barbell function associated with the multiple-to-one pixel mapping scenario is shown in equation (8):

$$f = \sum_m \sum_n \alpha(m,n) F_i(x + \Delta x_m, y + \Delta y_n) \tag{8}$$

In equation (8), the value $\alpha(m, n)$ is a weighting factor for each of the multiple pixels $(x_m, y_n)$ in a previous frame $F_i$ that are mapped to a single pixel (x, y) in the current frame $F_j$.

The barbell lifting scheme can improve motion prediction. FIG. 9(d) shows a scenario in which a barbell function uses motion vectors associated with pixels around a pixel, (x,y), in a current frame, $F_j$, to obtain multiple predictions from the previous frame, $F_i$, and generate a new prediction. Not only is motion vector $(\Delta x_0, \Delta y_0)$ used, but also motion vectors $(\Delta x_{-1}, \Delta y_{-1})$ and $(\Delta x_{+1}, \Delta y_{+1})$. An exemplary barbell function is shown in equation (9):

$$f = \sum_{m=0,\pm 1} \sum_{n=0,\pm 1} \alpha(m,n) F_i(x + \Delta x_m, y + \Delta y_n) \tag{9}$$

In equation (9), the values m and n take on all possible combinations of 0, 1, and −1. The value $\alpha(m, n)$ is a weighting factor. Although equation (9) describes a scenario involving eight neighboring pixels, the barbell function is not limited to eight neighboring pixels. Indeed, the barbell function specified in equation (9) can be extended to more general cases, such as less or more than eight neighboring pixels.

Figure 10:
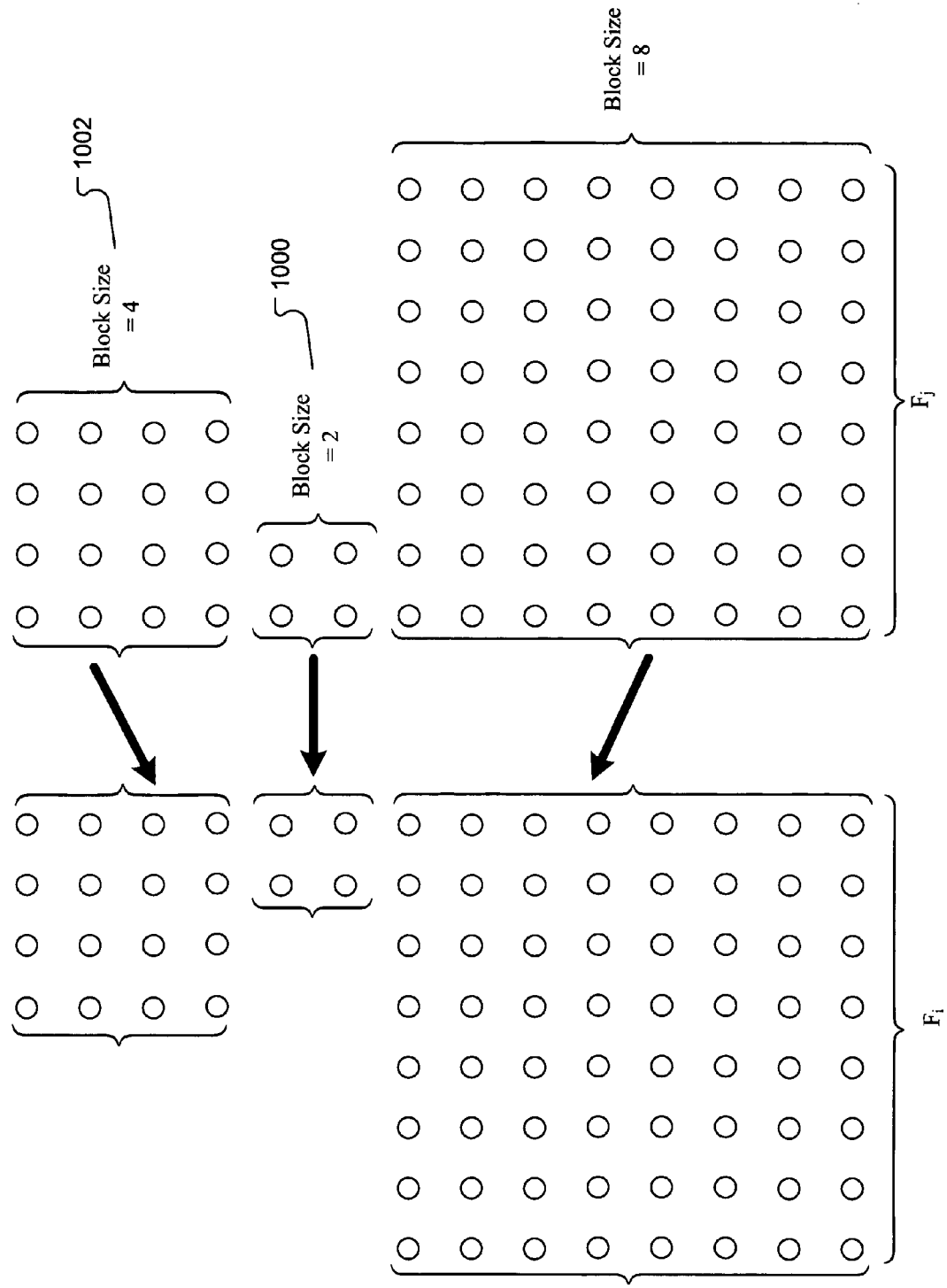
FIG. 10 illustrates various exemplary blocks of pixels, each having a different block size, to which the Barbell lifting can be applied.

In addition, the barbell lifting scheme can be applied with adaptive block size motion alignment as shown in FIG. 10. In this implementation, the same barbell function is applied to a block of pixels, which can reduce overhead associated with the barbell functions. The block sizes can be adapted to different regions in a video frame. FIG. 10 illustrates pixels in a current frame $F_j$ as they relate to pixels in a previous frame $F_i$. As shown, pixels can be grouped into blocks of various sizes, such as, but not limited to, a block size of two (1000), four (1002), or eight (1004) pixels. In one implementation of a temporal wavelet coder, the barbell lifting function is applied over a large block size in the flat regions of video and applied over small block size in complex regions.

Referring again to FIG. 9, as depicted in FIGS. 9(b) and (c), when pixels in different frames are aligned with motion vectors at fractional-pixel precision or with multiple-to-one pixel mapping, the prediction and update stages may have mismatch. Preferably, the update and prediction stages use the same motion vector(s) in order to save overhead bits to code motion vectors. The motion vector of the update stage is the inverse of the motion vector at the prediction stage, i.e., the same value but reverse direction.

Figure 11:
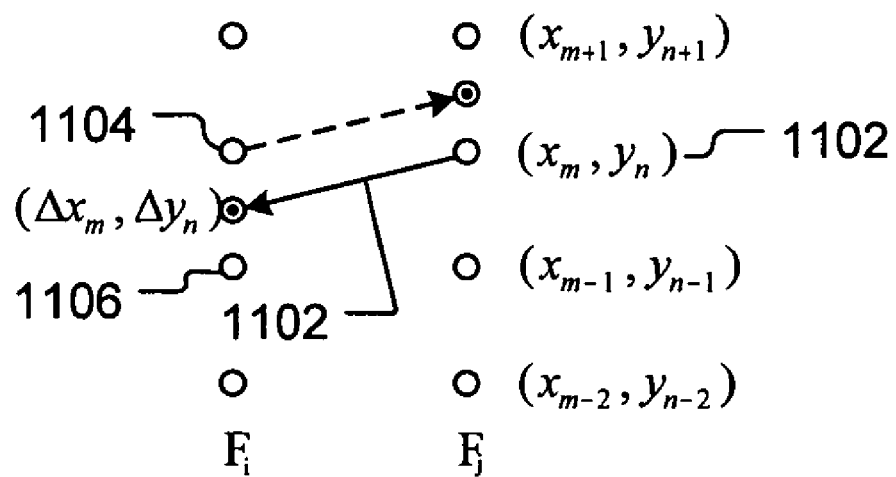
FIG. 11 illustrates a pixel mismatch problem that can arise with motion alignment.

FIG. 11 depicts an exemplary mismatch scenario. For example, the motion vector $(\Delta x_m, \Delta y_n)$ 1100 of pixel $F_j(x_m, y_n)$ 1102 points to a fractional location in frame $F_i$. Assuming linear interpolation is applied, it means that the prediction of pixel $F_j(x_m, y_n)$ 1102 is the weighted average of pixel 1104 and pixel 1106. In the update stage, the motion vector of pixel 1104 has the same value and inverse direction of $(\Delta x_m, \Delta y_n)$ as shown by the arrow with dashed line in FIG. 11. Therefore, pixel 1104 is updated with the predicted results of $F_j(x_m, y_n)$ and $F_j(x_{m+1}, y_{n+1})$. The mismatch is that the prediction has the path from pixel 1106 to $F_j(x_m, y_n)$ but the update has the path from $F_j(x_{m+1}, y_{n+1})$ to pixel 1104

The barbell lifting process can solve this problem. In the update stage the high-pass coefficients are distributed to those pixels that are used to calculate the high-pass coefficients in the prediction stage. Combining equations (2) and (8), the high-pass coefficient is obtained as follows:

$$h_j(x, y) = F_j(x, y) + \sum_i \sum_m \sum_n \alpha_i \alpha_{i,j}(x, y, m, n) F_i(x + \Delta x_m, y + \Delta y_n) \quad (10)$$

The value $\alpha_{i,j}(x,y,m,n)$ is the barbell parameter specified by the coordination x, y, m, n. The low-pass coefficient is calculated as follows:

$$l_i(x, y) = F_i(x, y) + \sum_j \sum_m \sum_n b_j \alpha_{i,j}(x, y, m, n) h_j(x + \Delta x_m, y + \Delta y_n) \quad (11)$$

This means that the high-pass coefficient will be added exactly to the pixels they predict. For the above example, the predicted weight from pixel 1106 to $F_j(x_m, y_n)$ is non-zero. Therefore, the update weight from $F_j(x_m, y_n)$ to pixel 1106, which equals the predict weight, is also non-zero. This process eliminates mismatch between the prediction stage and the update stage. The barbell lifting process corresponding to the equations (10) and (11) is depicted in FIG. 12.

Figure 12:
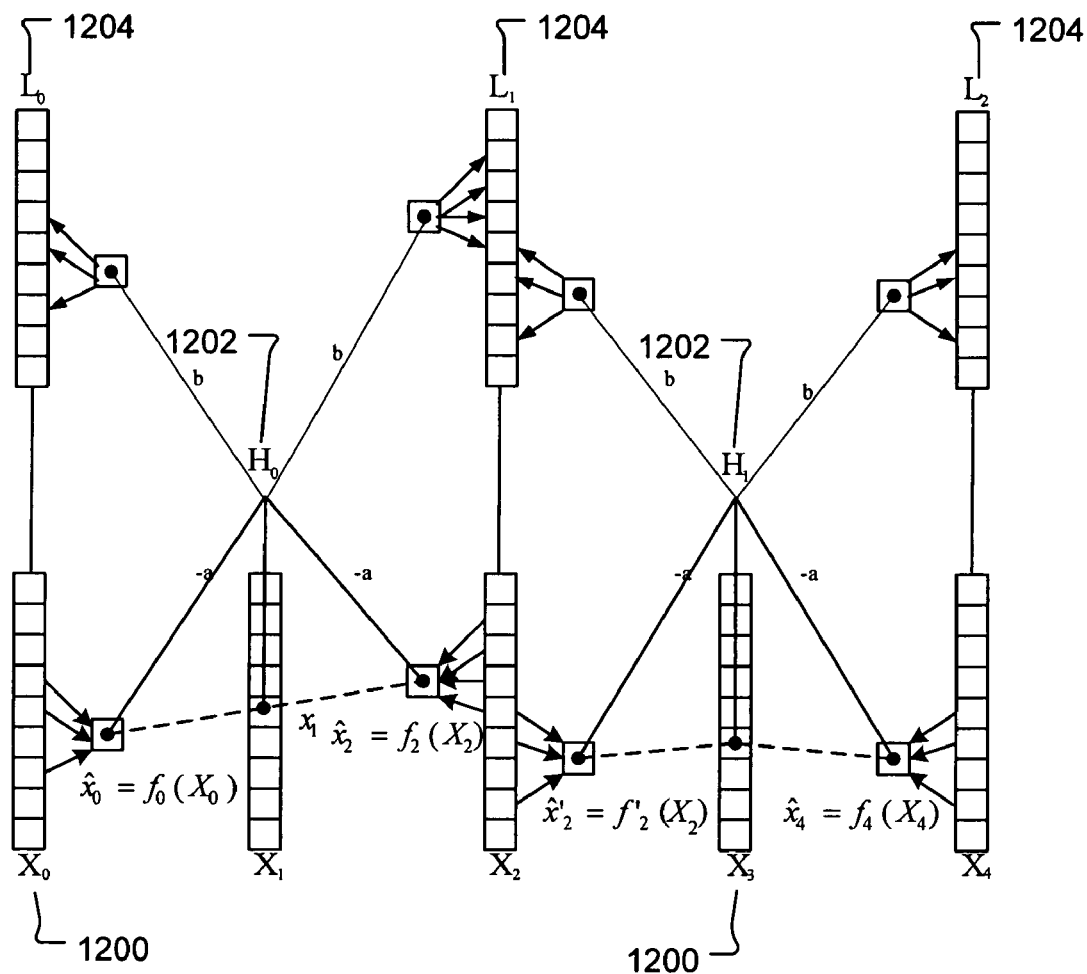
FIG. 12 illustrates an exemplary wavelet lifting scheme with barbell functions, which can solve the mismatch problem of FIG. 11.

FIG. 12 illustrates a sequence of 1-D pixel arrays 1200 that are barbell lifted to high-pass coefficient arrays 1202 and low-pass coefficient arrays 1204. Using equation (10) to obtain the high-pass coefficients and equation (11) to obtain the low-pass coefficients, the prediction and update stages are consistent. The new update stage avoids the need to derive inverse motion vectors. Therefore, the proposed technique preserves the operations, while avoiding ambiguity in the update stage.

Multi-Layer Video Application

In a preferred implementation of a video system, barbell functions used by the video coder are reproduced at the decoder. Information that describes the barbell functions is encoded by the video coder and transmitted to the decoder. The type and amount of barbell function information that is coded and transmitted can be adapted to achieve a selected performance goal.

An exemplary video coder employs a rate-distortion (RD) optimized approach to achieve a balance between decomposition efficiency and the amount of barbell information. In this implementation, the barbell information is encoded in a scalable fashion to improve the coding efficiency at low bit-rate. Scalability can be achieved using multiple video layers, wherein progressively higher layers provide more bits to improve video quality.

Figure 13:
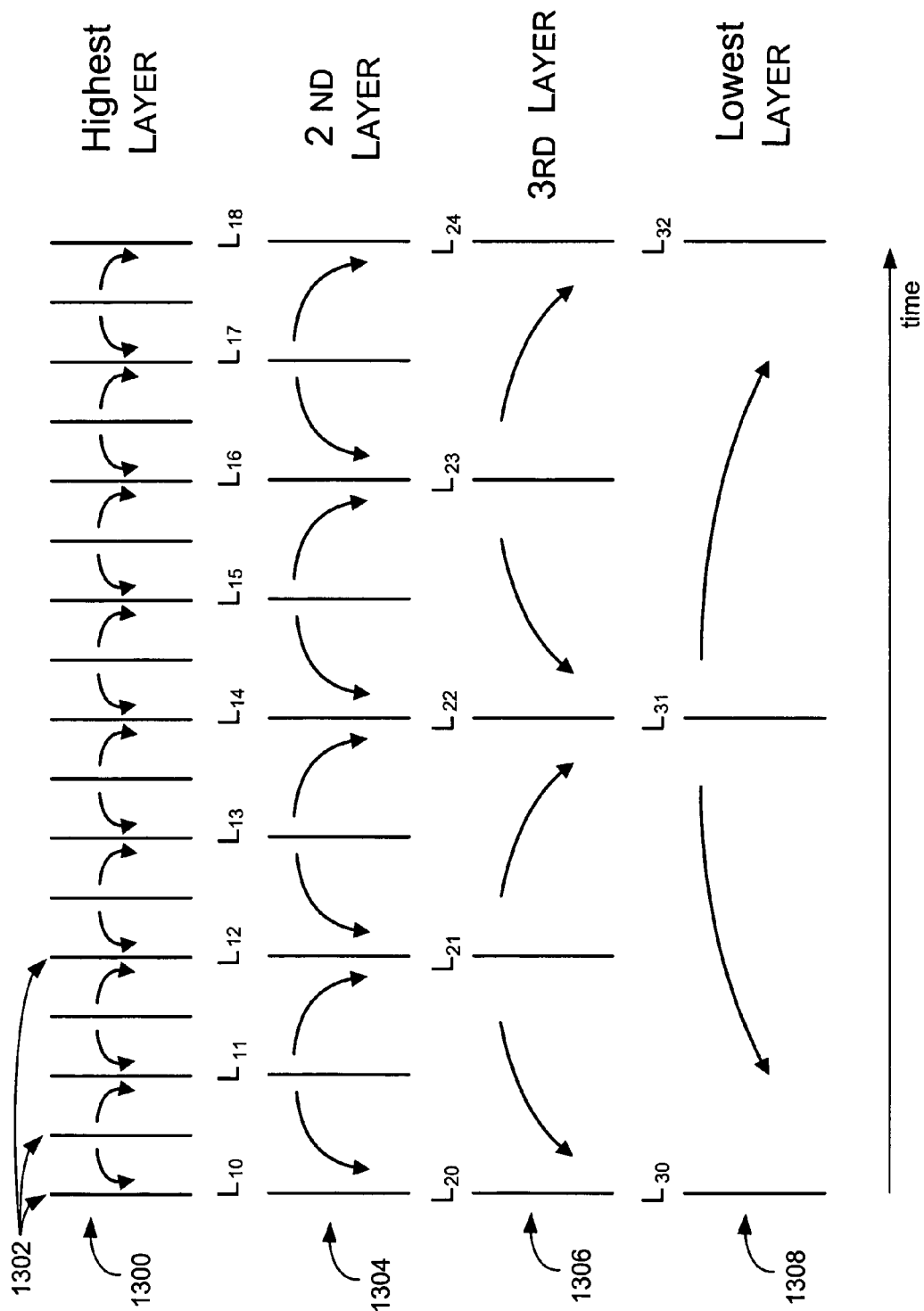
FIG. 13 illustrates exemplary video layers in multiple layer video.

When a barbell function is applied to temporal decomposition, a multiple-layer structure can be used to further exploit temporal correlation. FIG. 13 illustrates four exemplary video layers that make up multiple layer video. Although FIG. 13 illustrates four layers, it is to be understood that multiple-layer video can be coded into more or fewer than four layers, depending on the particular implementation. The highest layer 1300 includes a sequence of original video frames 1302, typically with full frame rate. The highest layer 1300 is coded into progressively lower layers: a second layer 1304, a third layer 1306, and lowest layer 1308.

The second layer 1304, third layer 1306, and lowest layer 1308 are each made up of a series of low-pass frames containing low-pass barbell coded coefficients. As illustrated, the second layer 1304 includes low-pass frames $L_{10}$ through $L_{18}$; the third layer 1306 includes low-pass frames $L_{20}$ through $L_{24}$; the lowest layer includes low-pass frames $L_{30}$ through $L_{32}$.

Higher layer frames are used to generate lower layer frames. For example, the highest layer 1300 is used to obtain the second layer 1304; the second layer 1304 is used to obtain the third layer 1306, and so on. The layers can be further split into high-pass frames and additional low-pass frames. The correlation between two neighboring layers can be utilized to vary the number of bits used to express parameters of barbell functions, for example motion vectors.

Inter-layer correlation may be utilized in a high-to-low method or a low-to-high method. In the high-to-low method, motion vectors are first estimated at the highest layer 1300 and subsequently predicted the lower layer 1304 from the higher layer 1300, with this process repeating for progressively lower layers. Since the frame interval is the shortest in the highest layer 1300, motion estimation in the highest layer 1300 is typically more accurate than in lower layers. This method can ensure the accuracy of inter-layer prediction. However, in high-to-low method, when only lower layers are decoded, higher layer motion vectors have to be decoded to predict lower layer ones. Hence the high-to-low method is typically not efficient for low bit-rate applications.

In the low-to-high method, motion vectors in a lower layer do not depend on motion vectors in higher layers. As a result, the higher layer motion vectors need not be transmitted when the decoder operates in the temporal scalable mode. Hence, the low-to-high method has less motion vector overhead at low bit rates. One disadvantage relates to the precision of the motion vectors. Since the first-layer motion estimation is performed on the lowest layer where the frame rate is the lowest, the precision of motion estimation at this level is typically limited.

Considering the low-to-high and the high-to-low methods, one approach involves to estimating motion vectors from high layer to low layer and coding motion vectors from low layer to high layer. This approach includes a number of motion vector coding modes that can be adaptively applied to achieve a desired performance or level of refinement. Generally, the motion vector coding modes are categorized as inter-layer and intra-layer.

FIG. 14 illustrates three exemplary inter-layer motion vector coding modes that may be used to scalably code motion vector information. FIG. 14a illustrates a half magnitude mode 1400 (called DirL mode). FIG. 14b illustrates two modes: a forward transmit-backward generate mode (FT_BDL) 1402 and a backward transmit-forward generate mode (BT_FDL) 1404. Each of these exemplary modes is discussed in detail.

The DirL mode 1400 is an inter-layer correlated bidirectional mode. In the DirL mode 1400, the decoder determines motion vectors in a higher enhancement layer based on a fraction of the magnitude of motion vectors in a lower enhancement layer. For example, a forward motion vector 1406 and a backward motion vector 1408 in a higher enhancement layer 1410 are each set equal to half the absolute value of a predicting motion vector 1412 of a lower layer 1414, with a sign change to the backward motion vector 1408. Thus, no motion bits need to be transmitted for the higher enhancement layer. Types of motion that may be particularly suitable for DirL mode 1400 are smooth motion or background motion.

The FT_BDL mode 1402 is another inter-layer correlated bidirectional mode. In this mode only a forward motion vector 1416 in the higher layer 1410 is transmitted to the decoder. A corresponding backward motion vector 1418 is calculated by the decoder using the equation:

$$MV_{bwd} = MV_{fwd} \pm MV_{prevlayer},$$

wherein $MV_{prevlayer}$ represents the predicted motion vector 1412 in the lower layer 1414. The selection of '+' or '−' operator depends on whether $MV_{prevlayer}$ is in the backward or forward direction.

The BT_FDL mode 1404 is another inter-layer correlated bidirectional mode. In this mode only a backward motion vector 1420 in the higher layer 1410 is transmitted to the decoder. A corresponding forward motion vector 1422 is calculated by the decoder using the equation:

$$MV_{fwd} = MV_{bwd} \pm MV_{prevlayer},$$

Again, the selection of '+' or '−' operator depends on whether $MV_{prevlayer}$ is in the backward or forward direction.

In the FT_BDL and BT_FDL modes, the absolute values (i.e., magnitudes) of the bi-directional motion vectors are not necessarily equal. When choosing between the FT_BDL and BT_FDL modes, the mode with less motion cost is chosen. Motion cost is discussed in further detail below.

The inter-layer modes can be applied to different sizes of frame regions, such as macroblock, block and sub-block. Furthermore, the precision of motion vectors can be any one of integer-pixel, half-pixel, and quarter pixel. The inter-layer modes DirL, FT_BDL, and BT_FDL can also be applied with intra-layer modes. Four exemplary intra-layer modes are shown and described in FIG. 15 and FIG. 16.

Figure 15A:
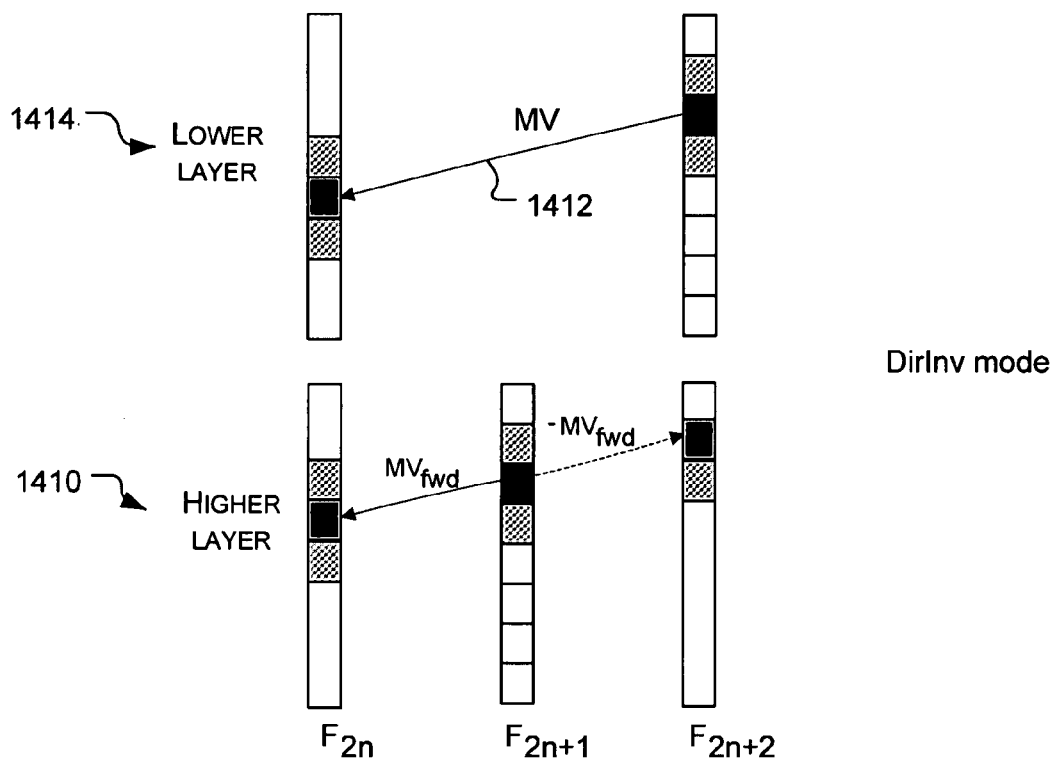
FIGS. 15a-15b illustrates exemplary intra-layer motion vector coding schemes that may be used to scalably code motion vector information.
Figure 15B:
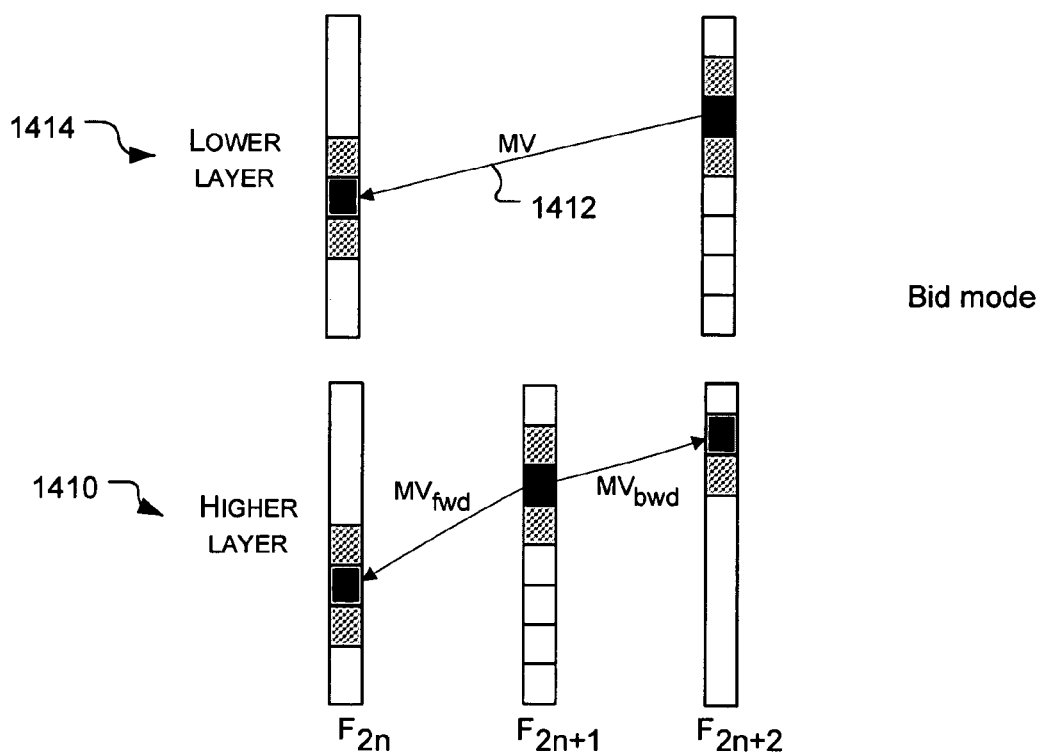

FIG. 15 illustrates two exemplary intra-layer motion vector coding modes that may be used to scalably code motion vector information. FIG. 15a illustrates an inverse direction mode (DirInv) 1500. FIG. 15b illustrates a normal bidirectional mode 1502.

DirInv mode 1500 is an intra-layer correlated bidirectional mode, in which forward and backward motion vectors have the same absolute value but opposite signs. For example, as illustrated in FIG. 15a, a forward motion vector 1504 in the higher layer 1410 is set equal to the motion vector 1412 in the lower layer 1414. A related backward motion vector 1506 is not transmitted, but is given the opposite sign as the forward motion vector 1504. Hence, $MV_{bwd} = -MV_{fwd}$. Thus, in the DirInv mode, only one directional motion vector needs to be transmitted.

In the normal bidirectional motion vector mode 1502, both a forward motion vector 1508 and a backward motion vector 1510 are coded and transmitted to the decoder. The motion vector coding modes shown in FIG. 16 reduce the amount of motion vector information that needs to be transmitted.

Figure 16A:
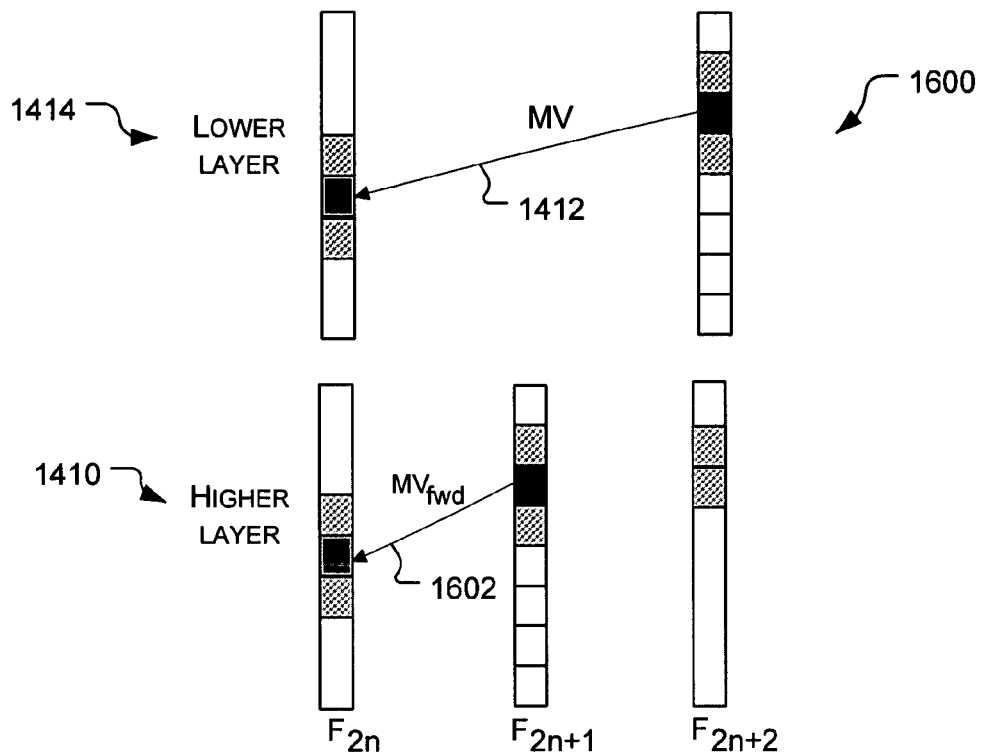
FIGS. 16a-16b illustrates two more exemplary intra-layer motion vector coding schemes that may be used to scalably code motion vector information.

FIG. 16a illustrates a forward mode (Fwd) 1600. Forward mode is a single-directional mode. Only a forward motion vector 1602 is transmitted, and the backward direction of the thread is terminated. For certain types of motion, such as occlusion, a truly-matched pixel may exist only in the forward frame. Therefore, the motion threads should be terminated in the backward direction.

Figure 16B:
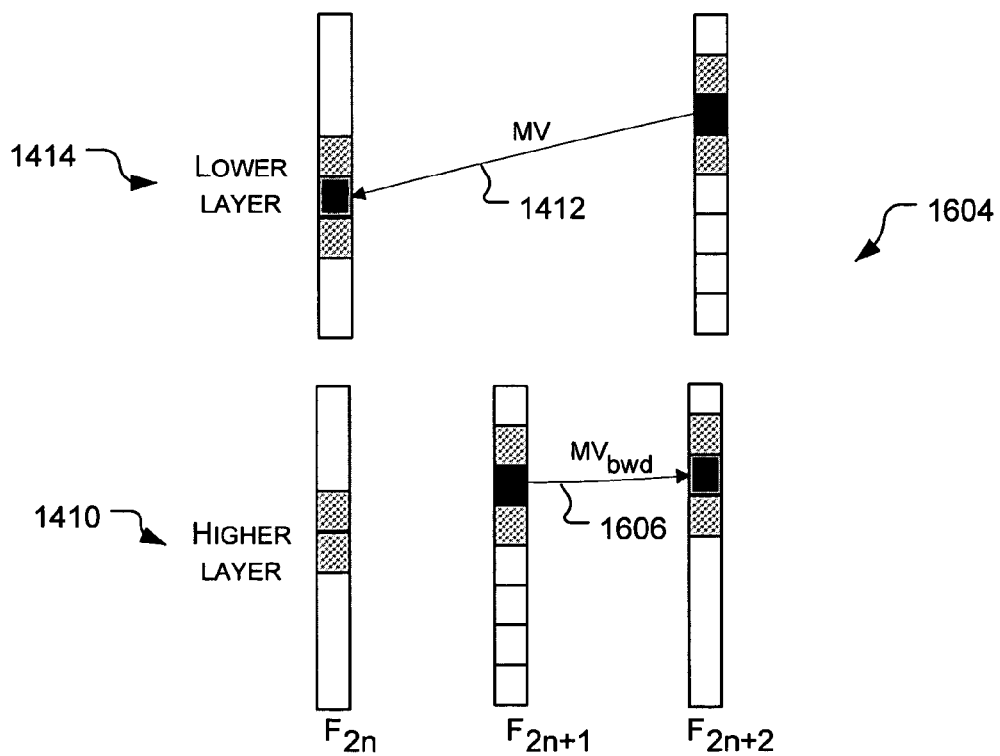

FIG. 16b illustrates a backward mode (Bwd) 1604. Backward mode 1604 is another single-directional mode. In this mode, only a backward motion vector 1606 is transmitted, and the forward direction of the thread is terminated. In this case, when a motion such as occlusion occurs and a truly-matched pixel exists in the backward frame, the motion threads should be terminated in the forward direction.

A video coder can select among the seven modes described above and apply the selected mode to a macroblock. The video coder attaches a special symbol to each macroblock to indicate which mode has been applied to the macroblock. In a particular implementation, a cost value is calculated for each mode. The mode with the smallest cost is selected for each macroblock based on a rate-distortion (R-D) optimized criterion. The mode selection criterion is defined as:

$$\text{Cost} = \eta \cdot SAD + \lambda \cdot \text{Bits}_{motion}, \quad (12)$$

wherein SAD represents the sum of the absolute difference between the current macroblock and the motion compensated matching blocks. The SAD value represents a measure of the matching correctness between associated forward and backward motion vectors.

For bi-directional modes, such as Bid, DirL and DirInv, the SAD term is the average of the forward and backward SAD values. For Fwd and Bwd modes, the SAD term is equal to the SAD value related to the transmitted motion vector, because the other direction is terminated.

Pixels belonging to a macroblock that is coded with Fwd or Bwd modes are the boundaries of the motion. The wavelet synthesis error on the boundary is larger than that on non-boundary pixels. To reduce boundary effects, $\eta$ is set as follows to add a penalty to the Fwd and Bwd modes.

$$\eta = \begin{cases} 1 & Bid, FT\_BDL, BT\_FDL, DIRINV \\ 1.5 & Fwd, Bwd \end{cases} \quad (13)$$

Figure 17:
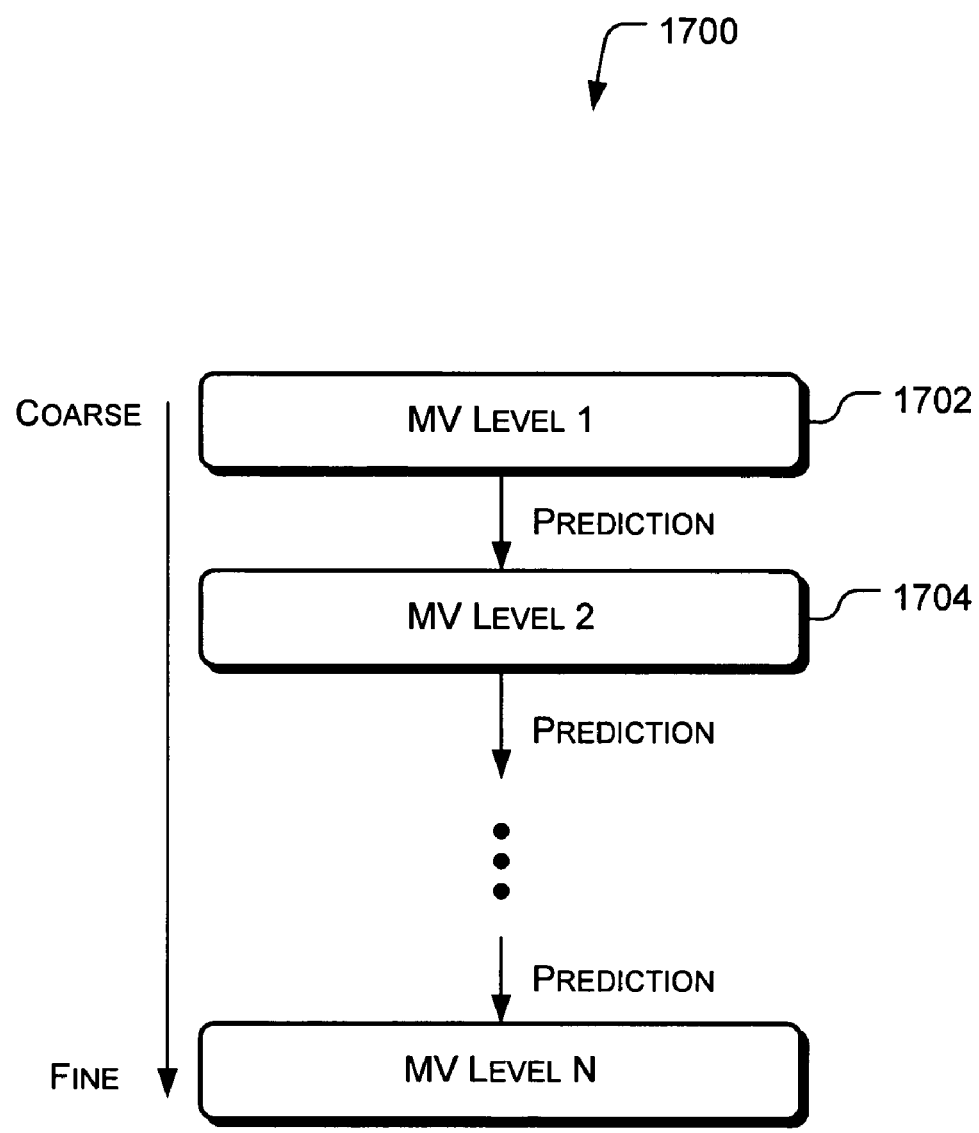
FIG. 17 illustrates a scalable motion vector coding algorithm wherein motion vector information is coded coarsely at low bit-rates and finely at higher bit-rates.

In equation (12), $\text{Bits}_{motion}$ represents the number of bits used to code the motion vector difference (MVD) between two enhancement layers. In Bid mode, both the forward and backward motion vectors are coded, and $\text{Bits}_{motion}$ represents the number of bits for the bi-directional motion vectors. In the other modes, $\text{Bits}_{motion}$ represents the number of bits required to code single-direction motion vectors. $\lambda$ is a Lagrangian multiplier that represents a trade-off between rate and distortion. Typically $\lambda$ is a large value for low bit rates and a small value for high bit rates FIG. 17 illustrates a scalable motion vector coding algorithm 1700 wherein motion vector information is coded coarsely at low bit-rates and finely at higher bit-rates. The algorithm 1700 generates motion vector information that includes one base level and multiple enhancement levels. For example, a first level 1702 generates coded motion vector data at a base level. A second level 1704 generates motion vector data at a higher level, and so on. The more levels that are generated, the finer the precision in motion estimation. The motion vector levels are transmitted as an embedded stream in the coded video data.

At the decoder, the levels of motion vector data are used to generate decoded motion vector data at corresponding levels of refinement. A coarse motion field can be reconstructed from the base level of motion stream and it can be successively refined by decoding progressively higher enhancement level data. The base level of motion corresponds to a low bit-rate and is generated using a relatively large $\lambda$, while the enhancement levels of motion correspond to higher bit-rates and are generated using a set of relatively small $\lambda$.

Both the base level and the enhancement levels can be obtained by any existing motion estimation and coding techniques. For fast and efficient estimation and coding of the enhancement levels, we should fully take advantage of the motion vectors (MVs) and block partition modes already coded in its previous level. The coded MVs of a block in the previous level can be used as one candidate of predicted MV and the block partition modes obtained from the previous level can be regarded as the initial status of partitioning for the co-located block in the current level.

The above arrangements of using different $\lambda$ at different levels enable rate scalability of motion. In addition, the temporal and spatial scalability of motion can be supported as well. In the Barbell lifting scheme, a natural way to support the temporal scalability is to bind the motion vectors with the temporal high-band coefficients at the same layer and drop them together if it is necessary. To support different spatial resolutions, the motion levels can be produced at different resolutions. For example, we can perform motion estimation on quarter common image format (QCIF) format of a video in Level 1 and perform motion estimation on CIF format of the video in Level 2. The motion obtained in Level 1 will be up-sampled into a CIF resolution before it is used by Level 2 as prediction.

To achieve high coding efficiency, a preferred implementation of a video coder exploits temporal correlation among frames with motion using a method as described in FIG. 17. More levels of motion data can provide greater accuracy in motion. Typically, higher bit rates allow for coding and transmitting more levels of motion data. However, when the bit rate is low, fewer motion levels need to be coded or transmitted. When fewer motion levels are transmitted, other bits may be allocated to other information, such as texture information.

The number of motion levels is selected based on the bit-rate. As bit-rate decreases, at a specified bit-rate, the number of motion levels decreases. As bit-rate increases, at the specified bit-rate, the number of motion levels increases. The specified bit-rate, called a switching bit-rate, can be computed using a decision method. In a particular implementation of a video coder, the decision is to select motion $M_i$, for given bit-rate R, according to the set function:

$$\arg\min_i \{D_t(R - R_{Mi}) + D_{Mismatch}(M, M_i)\} \ (1 \leq i \leq n), \quad (14)$$

wherein $D_t(R_t)$ denotes the rate-distortion function of video decoded with lossless motion, $R_i$ represents the rate for truncated motion vector stream $M_i$, $D_{mismatch}$ represents distortion caused by motion mismatch between two motion levels, $M_1, M_2, \ldots, M_n$ represent n motion levels, and the motion rate as $R_{M1}, R_{M2}, \ldots, R_{Mn}$ represent motion rates associated with the motion levels, respectively. $M=M_n$ corresponds to the finest motion level.

Because $D_{mismatch}(M_i, M_i)=0$, the mismatch of each motion level can be obtained by losslessly decoding all the coefficients at that motion level. This is practical if the number of motion levels is few. $D_t(R_t)$ can be estimated from the rate distortion (R-D) information of coefficients in each subband within the frequency domain. For a given bit rate R, the distortion $D_i(R)$ of video decoded at motion level $M_i$ can be estimated by:

$$D_i(R)=D_t(R-R_{Mi})+D_{Mismatch}(M,M_i) \quad (15)$$

Exemplary Operations

Described herein are exemplary methods for barbell lifting for video coding. The methods described herein may be embodied as logic instructions on one or more computer-readable medium. When executed on a processor, the logic instructions cause a general purpose computing device to be programmed as a special-purpose machine that implements the described methods. In the following exemplary operations, the components and connections depicted in the figures may be used to implement lifting for video coding.

Figure 18:
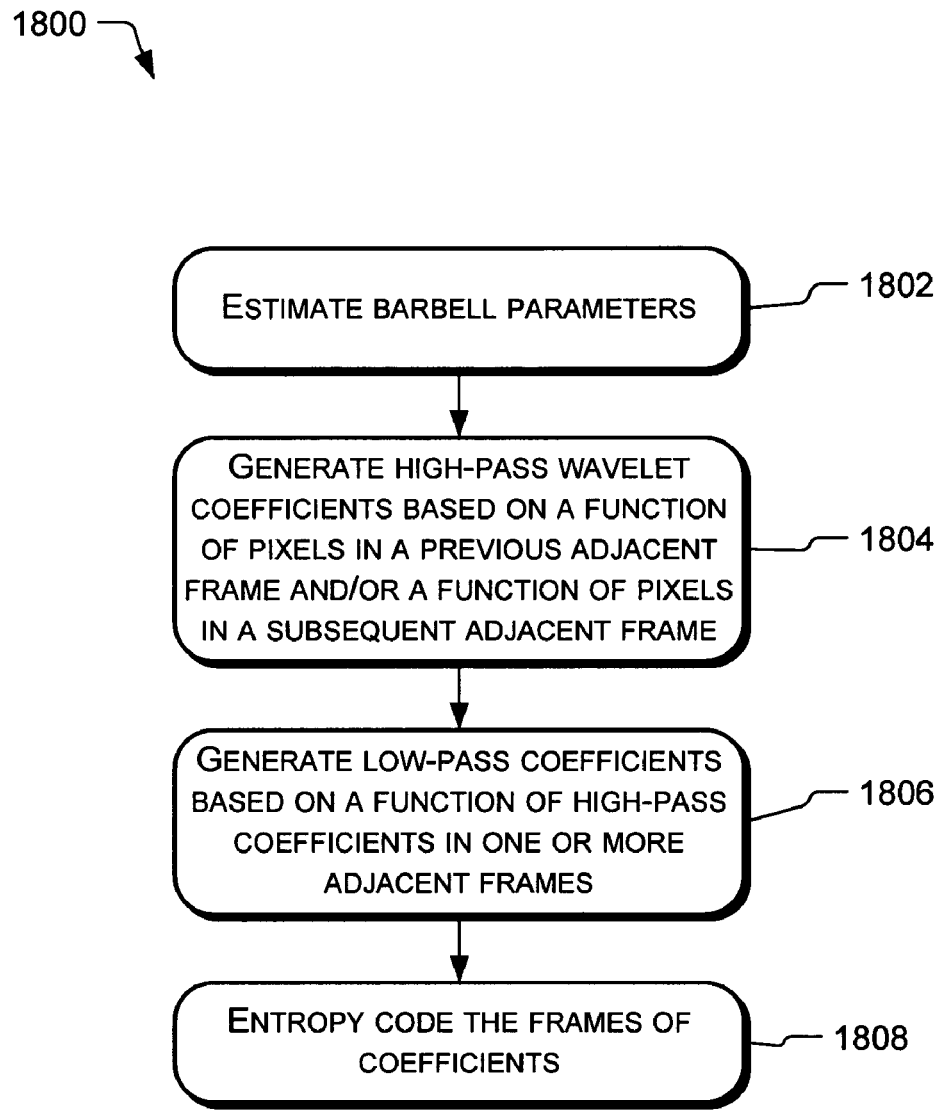
FIG. 18 is a flow chart illustrating an exemplary algorithm for coding video data using barbell lifting.

FIG. 18 illustrates an exemplary enhanced wavelet lifting algorithm 1800 for coding video data using barbell lifting. A video coder, such as the video coder shown in FIG. 2, can execute the operations shown in the algorithm 1800. It is assumed that a sequence of video frames is input to the video coder.

An estimating operation 1802 estimates barbell lifting parameters. In one implementation, when the barbell lifting function is used for motion alignment, the estimating operation 1802 estimates the motion data (e.g., motion vectors, coding modes and interpolation). In this implementation, the motion data are estimated in either of frame, group of macroblocks, macroblock and block.

In another implementation of the estimating operation 1802, when the barbell lifting function is used for spatial prediction, the prediction data (prediction directions, coding modes and interpolation) are estimated. In this implementation, the prediction data are estimated in either of frame, group of macroblocks, macroblock and block.

The estimated parameters generated by the estimating operation 1802 are used in the barbell lifting functions of the barbell lifting process to decompose the input video signal into low-pass and high-pass coefficients. The barbell lifting process includes two stages: a prediction stage, and an update stage. The prediction stage is embodied in a first generating operation 1804, and the update stage is embodied in another generating operation 1806.

The first generating operation 1804 generates high-pass wavelet coefficients based on a function of pixels in the previous adjacent frame and a function of pixels in a subsequent adjacent frame. High-pass coefficients are generated for every other frame in a frame sequence. Typically, high-pass coefficients are generated for the odd frames in the sequence. The functions of the pixels in adjacent frames may be linear, or non-linear. Exemplary functions are shown and described above. A discrete wavelet transform is applied iteratively for each pixel in the frame, including the barbell functions, to generate the high-pass frame.

The second generating operation 1806 generates low-pass wavelet coefficients based on a function of high-pass coefficients in one or more adjacent frames. The low-pass coefficients are generated for the frames for which high-pass coefficients were not generated. Typically, low-pass coefficients are generated for the even frames in the sequence. The function of high-pass coefficients may be linear or non-linear. Exemplary barbell functions are shown and described above. A discrete wavelet transform is performed over the functions of high-pass coefficients and each pixel in the frame to generate a frame of low-pass coefficients.

The estimated parameters and the decomposed coefficients are input to an entropy coding operation 1808. The entropy coding operation 1808 applies an entropy coding algorithm, such as Fibonacci coding, Golomb coding, Rice coding, Huffman coding, or Range coding. The algorithm performed by the entropy coding operation 1808 compresses the data even more, by assigning the most common data symbols to the shortest codes.

Figure 19:
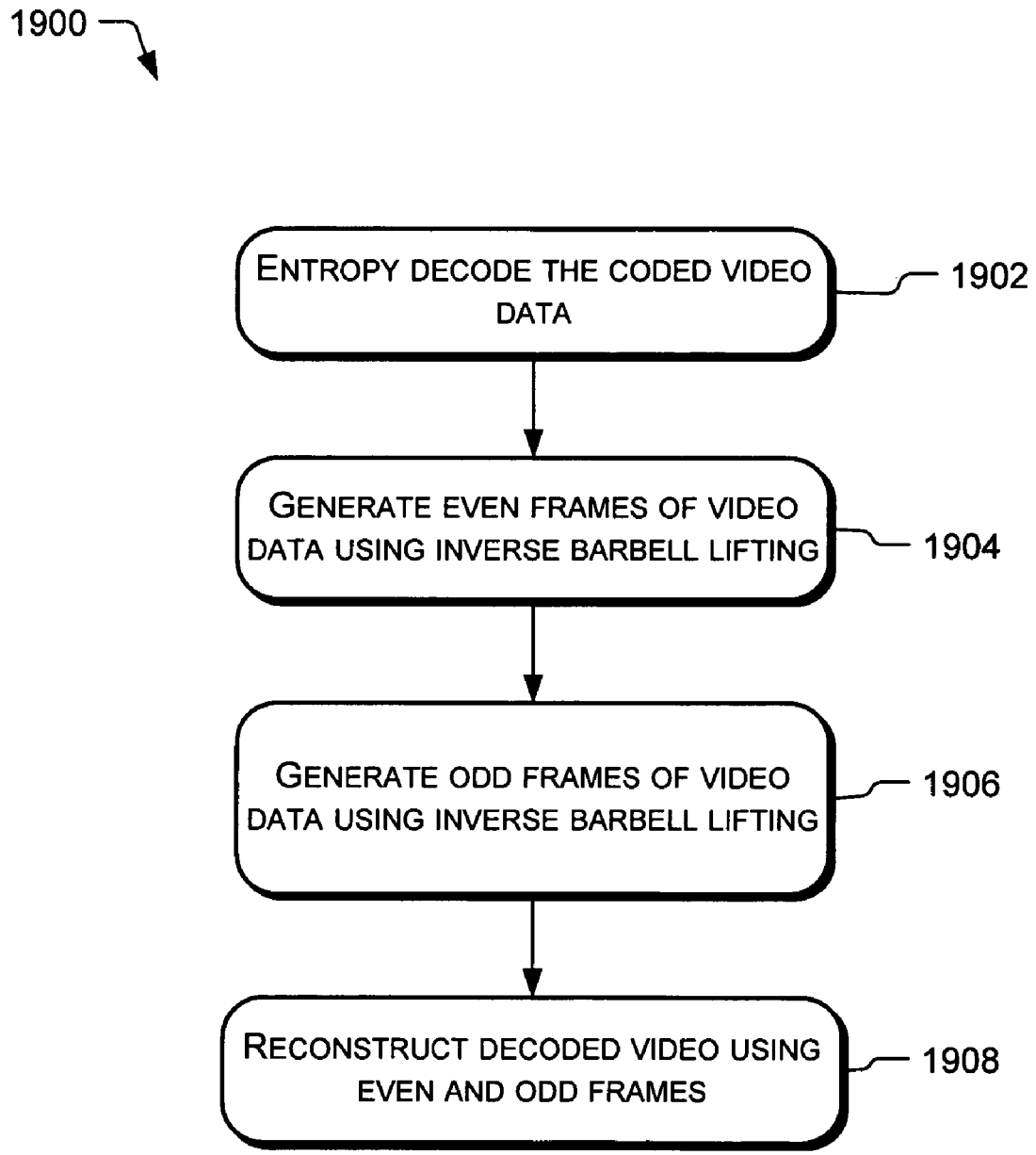
FIG. 19 is a flow chart illustrating an exemplary algorithm for decoding frames of data that has been coded using barbell lifting.

FIG. 19 illustrates an exemplary decoding algorithm 1900 for decoding coded video data that is coded using barbell lifting. Typically, the decoding algorithm 1900 is performed by a decoder executing as part of a video receiver. It is assumed that the input to the decoding algorithm 1900 is a signal containing frames that have been encoded using barbell lifting as described above.

An entropy decoding operation 1902 entropy decodes the received barbell lifting coded frames. The entropy decoding operation 1902 performs substantially the inverse of operation 1808 (FIG. 18). The output of the entropy decoding operation 1902 is a sequence of alternating low-pass and high-pass frames.

A generating operation 1904 generates even frames of video data using inverse barbell lifting. Each pixel in the even frames is generated by performing an inverse wavelet transform on a combination of high-pass coefficients in one or more adjacent frames and a corresponding low-pass coefficient. A barbell function that was used in the coding process is applied to the high-pass coefficients and input to the inverse wavelet transform. The even frames of video data are generated by performing the generating operation 1404 for all pixels in the even frames.

Another generating operation 1906 then generates the remaining frames of video data using inverse barbell lifting. Each pixel in an odd frame is generated by performing an inverse wavelet transform on a combination of pixels in adjacent video frames and a corresponding high-pass coefficient. A barbell function that was used in the coding process is applied to the pixels in the adjacent video frame and input to the inverse wavelet transform. The odd frames of video data are generated by performing the generating operation 1906 for all pixels in the odd frames.

A reconstructing operation 1908 reconstructs the original video using the even and odd decoded video frames. The reconstructing operation 1908 puts the decoded video frames in order and prepares them for storage or presentation.

Exemplary Computing Device

Figure 20:
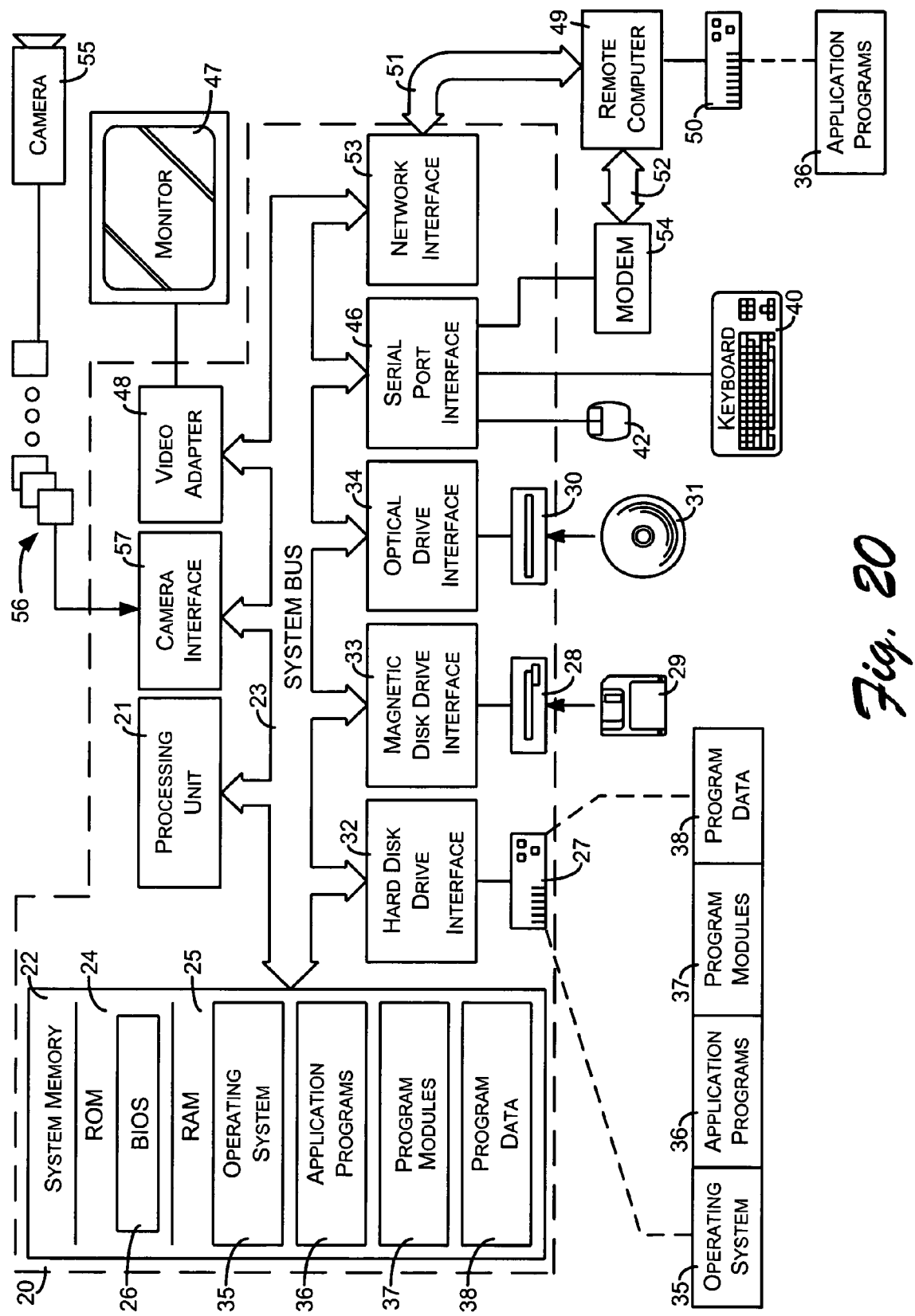
FIG. 20 illustrates a general purpose computer that can be used to implement barbell lifting to code and decode video.

With reference to FIG. 20, an exemplary system for implementing the operations described herein includes a general-purpose computing device in the form of a conventional personal computer 20, including a processing unit 21, a system memory 22, and a system bus 23. System bus 23 links together various system components including system memory 22 and processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system 26 (BIOS), containing the basic routine that helps to transfer information between elements within the personal computer 20, such as during start-up, is stored in ROM 24.

As depicted, in this example personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM, DVD, or other like optical media. Hard disk drive 27, magnetic disk drive 28, and optical disk drive 30 are connected to the system bus 23 by a hard disk drive interface 32, a magnetic disk drive interface 33, and an optical drive interface 34, respectively. These exemplary drives and their associated computer-readable media provide nonvolatile storage of computer readable instructions, computer programs and other data for the personal computer .

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs), read only memories (ROMs), and the like, may also be used in the exemplary operating environment.

A number of computer programs may be stored on the hard disk, magnetic disk 29, optical disk 31, ROM 24 or RAM 25, including an operating system 35, one or more application programs 36, other programs 37, and program data 38. A user may enter commands and information into the personal computer 20 through input devices such as a keyboard 40 and pointing device 42 (such as a mouse).

Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. In this example, interface 57 is connected to the system bus 23, thereby allowing the images to be routed to and stored in the RAM 25, or one of the other data storage devices associated with the computer 20. It is noted, however, that image data can be input into the computer 20 from any of the aforementioned computer-readable media as well, without requiring the use of the camera 55.

Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, a universal serial bus (USB), etc.

A monitor 47 or other type of display device is also connected to the system bus 23 via an interface, such as a video adapter 48. In addition to the monitor, personal computers typically include other peripheral output devices (not shown), such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the personal computer 20.

The logical connections depicted in FIG. 20 include a local area network (LAN) 51 and a wide area network (WAN) 52.

Such networking environments are commonplace in offices, enterprise-wide computer networks, Intranets and the Internet.

When used in a LAN networking environment, personal computer 20 is connected to local network 51 through a network interface or adapter 53. When used in a WAN networking environment, the personal computer 20 typically includes a modem 54 or other means for establishing communications over the wide area network 52, such as the Internet. Modem 54, which may be internal or external, is connected to system bus 23 via the serial port interface 46.

In a networked environment, computer programs depicted relative to personal computer 20, or portions thereof, may be stored in a remote memory storage device. It will be appreciated that the network connections shown are exemplary and other means of establishing a communications link between the computers may be used.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

Although the exemplary operating embodiment is described in terms of operational flows in a conventional computer, one skilled in the art will realize that the present invention can be embodied in any platform or environment that processes and/or communicates video signals. Examples include both programmable and non-programmable devices such as hardware having a dedicated purpose such as video conferencing, firmware, semiconductor devices, hand-held computers, palm-sized computers, cellular telephones, and the like.

Although some exemplary methods and systems have been illustrated in the accompanying drawings and described in the foregoing Detailed Description, it will be understood that the methods and systems shown and described are not limited to the particular implementation described herein, but rather are capable of numerous rearrangements, modifications and substitutions without departing from the spirit set forth herein.

What is claimed is:

1. A computer-readable medium having computer-executable instructions encoded thereon for executing a computer process on a computer, the computer process comprising:
    scalably generating a plurality of layers of wavelet coefficients based on a plurality of frames of video data;
    scalably generating motion vector data associated with the plurality of layers;
    combining the motion vector data and the plurality of layers of wavelet coefficients into a plurality of coded video frames representing the plurality of frames of video data;
    selecting a motion vector coding mode with which to scalably generate the motion vector data;
    wherein the selecting operation comprises selecting one of:
        a half magnitude mode;
        a forward transmit/backward generate mode;
        a backward transmit/forward generate mode; and
        an inverse direction mode;
    wherein scalably generating motion vector data comprises:
        generating a plurality of motion vectors encoded at a plurality of motion levels of resolution, including a base level and at least one enhancement level;
        determining a switching bit rate, wherein at a bit rate below the switching bit rate a base motion vector at the base level of resolution is transmitted and at a bit rate above the switching bit rate a fine motion vector at an enhancement level of resolution is transmitted, and wherein the determining comprises applying a function of the form:

$$\arg\min_i \{D_t(R - R_{Mi}) + D_{Mismatch}(M, M_i)\}, (1 \leq i \leq n)$$

wherein M represents a given motion vector, $M_i$ represents a motion vector encoded at an ith motion level, i represents one of n motion levels, R represent a bit rate associated with M, $R_{Mi}$ represents a bit rate associated with $M_i$, $D_t$ denotes a rate-distortion function, $D_{Mismatch}$ represents distortion caused by motion mismatch between M and $M_i$.

2. A computer-readable medium as recited in claim 1 wherein scalably generating a plurality of layers comprises generating a high layer of wavelet coefficients and a low layer of wavelet coefficients, and the generating motion vector data comprises generating motion vector data associated with the high layer, wherein the motion vector data associated with the high layer is based on motion vector data associated with the low layer.

3. A computer-readable medium as recited in claim 1 further comprising:
    selecting a motion vector coding mode with which to scalably generate the motion vector data associated with a portion of the video frame; and
    marking the portion of the video frame with an identifier of the selected motion vector coding mode.

4. A computer-readable medium as recited in claim 1 wherein the selecting is based on a rate-distortion optimization criterion.

5. A computer-readable medium as recited in claim 3 wherein the portion of the video frame is one of a macroblock, a block, or a sub-block.

6. A computer-readable medium as recited in claim 1 wherein generating motion vector data comprises coding motion vector data at an integer-pixel precision, half-pixel precision, or quarter-pixel precision.

7. A computer-readable medium as recited in claim 1 further comprising:
calculating a cost associated with each of a plurality of motion vector coding modes;
selecting a motion vector coding mode having least cost.

8. A computer-readable medium as recited in claim 1 wherein generating motion vector data comprises:
coding a first motion vector at a coarse level; and
coding a second motion vector at a fine level.

9. A computer-readable medium as recited in claim 1 further comprising transmitting the coded video frame.

10. A computer-readable medium as recited in claim 1 further comprising storing the coded video frame on computer-readable media.

11. A computer-readable medium as recited in claim 1 wherein scalably generating motion vector data further comprises estimating a distortion between a given motion vector at an associated bit rate and a motion vector encoded at an ith enhancement level by applying a function of the form:

$$D_i(R) = D_t(R - R_{Mi}) + D_{Mismatch}(M, M_i), (1 \leq i \leq n),$$

wherein M represents the given motion vector, $M_i$ represents a motion vector encoded at an ith motion level, i represents one of n motion levels, R represent a bit rate associated with M, $R_{Mi}$ represents a bit rate associated with $M_i$, $D_t$ denotes a rate-distortion function, $D_{Mismatch}$ represents distortion caused by motion mismatch between M and $M_i$.

12. A computer-readable medium as recited in claim 1 further comprising:
decoding only the base motion vector when the bit rate is below the switching bit rate;
decoding the base motion vector and the fine motion vector when the bit rate is greater than or equal to the switching bit rate.

13. A computing device comprising:
a processor; and
a memory coupled to the processor, the memory comprising computer-program instructions executable by the processor for:
scalably generating a plurality of layers of wavelet coefficients based on a plurality of frames of video data;
scalably generating motion vector data associated with the plurality of layers;
combining the motion vector data and the plurality of layers of wavelet coefficients into a plurality of coded video frames representing the plurality of frames of video data; and
selecting a motion vector coding mode with which to scalably generate the motion vector data;
wherein the selecting operation comprises selecting one of:
a half magnitude mode;
a forward transmit/backward generate mode;
a backward transmit/forward generate mode; and
an inverse direction mode;

wherein scalably generating motion vector data comprises:
generating a plurality of motion vectors encoded at a plurality of motion levels of resolution, including a base level and at least one enhancement level;
determining a switching bit rate, wherein at a bit rate below the switching bit rate a base motion vector at the base level of resolution is transmitted and at a bit rate above the switching bit rate a fine motion vector at an enhancement level of resolution is transmitted, and wherein the determining comprises applying a function of the form:

$$\arg\min_i \{D_t(R - R_{Mi}) + D_{Mismatch}(M, M_i)\}, (1 \leq i \leq n)$$

wherein M represents a given motion vector, $M_i$ represents a motion vector encoded at an ith motion level, i represents one of n motion levels, R represent a bit rate associated with M, $R_{Mi}$ represents a bit rate associated with $M_i$, $D_t$ denotes a rate-distortion function, $D_{Mismatch}$ represents distortion caused by motion mismatch between M and $M_i$.

14. The device recited in claim 13, wherein scalably generating a plurality of layers comprises generating a high layer of wavelet coefficients and a low layer of wavelet coefficients, and the generating motion vector data comprises generating motion vector data associated with the high layer, wherein the motion vector data associated with the high layer is based on motion vector data associated with the low layer.

15. The device recited in claim 13 further comprising:
selecting a motion vector coding mode with which to scalably generate the motion vector data associated with a portion of the video frame; and
marking the portion of the video frame with an identifier of the selected motion vector coding mode.

16. The device recited in claim 13, wherein the selecting is based on a rate-distortion optimization criterion.

17. The device recited in claim 15, wherein the portion of the video frame is one of a macroblock, a block, or a sub-block.

18. The device recited in claim 13, wherein generating motion vector data comprises coding motion vector data at an integer-pixel precision, half-pixel precision, or quarter-pixel precision.

19. The device recited in claim 13, further comprising:
calculating a cost associated with each of a plurality of motion vector coding modes;
selecting a motion vector coding mode having least cost.

20. The device recited in claim 13, wherein generating motion vector data comprises:
coding a first motion vector at a coarse level; and
coding a second motion vector at a fine level.

21. The device recited in claim 13 further comprising further comprising transmitting the coded video frame.

22. The device recited in claim 13 further comprising storing the coded video frame on computer-readable media.

23. The device recited in claim 13, wherein scalably generating motion vector data further comprises estimating a distortion between a given motion vector at an associated bit rate and a motion vector encoded at an ith enhancement level by applying a function of the form:

$$D_i(R) = D_t(R - R_{Mi}) + D_{Mismatch}(M, M_i), (1 \leq i \leq n),$$

wherein M represents the given motion vector, $M_i$ represents a motion vector encoded at an ith motion level, i represents one of n motion levels, R represent a bit rate associated with M, $R_{Mi}$ represents a bit rate associated with $M_i$, $D_t$ denotes a rate-distortion function, $D_{Mismatch}$ represents distortion caused by motion mismatch between M and $M_i$.

24. A computing device comprising:
a processor; and
a memory coupled to the processor, the memory comprising computer-program instructions executable by the processor for:
scalably generating a plurality of layers of wavelet coefficients based on a plurality of frames of video data;
scalably generating motion vector data associated with the plurality of layers;
combining the motion vector data and the plurality of layers of wavelet coefficients into a plurality of coded video frames representing the plurality of frames of video data
selecting a motion vector coding mode with which to scalably generate the motion vector data;
wherein the selecting operation comprises selecting one of:
a half magnitude mode;
a forward transmit/backward generate mode;
a backward transmit/forward generate mode; and
an inverse direction mode;
wherein scalably generating motion vector data comprises:
generating a plurality of motion vectors encoded at a plurality of motion levels of resolution, including a base level and at least one enhancement level;
determining a switching bit rate, wherein at a bit rate below the switching bit rate a base motion vector at the base level of resolution is transmitted and at a bit rate above the switching bit rate a fine motion vector at an enhancement level of resolution is transmitted, and
wherein scalably generating motion vector data further comprises estimating a distortion between a given motion vector at an associated bit rate and a motion vector encoded at an ith enhancement level by applying a function of the form:

$D_i(R)=D_t(R-R_{Mi})+D_{Mismatch}(M, M_i), (1 \leq i \leq n)$, wherein M represents the given motion vector, $M_i$ represents a motion vector encoded at an ith motion level, i represents one of n motion levels, R represent a bit rate associated with M, $R_{Mi}$ represents a bit rate associated with $M_i$, $D_t$ denotes a rate-distortion function, $D_{Mismatch}$ represents distortion caused by motion mismatch between M and $M_i$.

25. The device recited in claim 24 wherein scalably generating a plurality of layers comprises generating a high layer of wavelet coefficients and a low layer of wavelet coefficients, and the generating motion vector data comprises generating motion vector data associated with the high layer, wherein the motion vector data associated with the high layer is based on motion vector data associated with the low layer.

26. The device recited in claim 24, further comprising:
selecting a motion vector coding mode with which to scalably generate the motion vector data associated with a portion of the video frame; and
marking the portion of the video frame with an identifier of the selected motion vector coding mode.

27. The device recited in claim 24, wherein the selecting is based on a rate-distortion optimization criterion.

28. The device recited in claim 26, wherein the portion of the video frame is one of a macroblock, a block, or a sub-block.

29. The device recited in claim 24, wherein generating motion vector data comprises coding motion vector data at an integer-pixel precision, half-pixel precision, or quarter-pixel precision.

30. The device recited in claim 24, further comprising:
calculating a cost associated with each of a plurality of motion vector coding modes;
selecting a motion vector coding mode having least cost.

31. The device recited in claim 24, wherein generating motion vector data comprises:
coding a first motion vector at a coarse level; and
coding a second motion vector at a fine level.

32. The device recited in claim 24, further comprising transmitting the coded video frame.

33. The device recited in claim 24, wherein the determining comprises applying a function of the form:

$$\arg\min_i \{D_t(R - R_{Mi}) + D_{Mismatch}(M, M_i)\}, (1 \leq i \leq n)$$

wherein M represents a given motion vector, $M_i$ represents a motion vector encoded at an ith motion level, i represents one of n motion levels, R represent a bit rate associated with M, $R_{Mi}$ represents a bit rate associated with $M_i$, $D_t$ denotes a rate-distortion function, $D_{Mismatch}$ represents distortion caused by motion mismatch between M and $M_i$.

34. A computer-readable medium having computer-executable instructions encoded thereon for executing a computer process on a computer, the computer process comprising:
scalably generating a plurality of layers of wavelet coefficients based on a plurality of frames of video data;
scalably generating motion vector data associated with the plurality of layers;
combining the motion vector data and the plurality of layers of wavelet coefficients into a plurality of coded video frames representing the plurality of frames of video data
selecting a motion vector coding mode with which to scalably generate the motion vector data
wherein the selecting operation comprises selecting one of:
a half magnitude mode;
a forward transmit/backward generate mode;
a backward transmit/forward generate mode; and
an inverse direction mode;
wherein scalably generating motion vector data comprises:
generating a plurality of motion vectors encoded at a plurality of motion levels of resolution, including a base level and at least one enhancement level;
determining a switching bit rate, wherein at a bit rate below the switching bit rate a base motion vector at the base level of resolution is transmitted and at a bit rate above the switching bit rate a fine motion vector at an enhancement level of resolution is transmitted, and
wherein scalably generating motion vector data further comprises estimating a distortion between a given motion vector at an associated bit rate and a motion vector encoded at an ith enhancement level by applying a function of the form:

$D_i(R)=D_t(R-R_{Mi})+D_{Mismatch}(M, M_i), (1 \leq i \leq n)$, wherein M represents the given motion vector, $M_i$ represents a motion vector encoded at an ith motion level, i represents one of n motion levels, R represent a bit rate associated with M, $R_{Mi}$ represents a bit rate associated with $M_i$, $D_t$ denotes a rate-distortion function, $D_{Mismatch}$ represents distortion caused by motion mismatch between M and $M_i$.

35. A computer-readable medium as recited in claim 34, wherein scalably generating a plurality of layers comprises generating a high layer of wavelet coefficients and a low layer of wavelet coefficients, and the generating motion vector data comprises generating motion vector data associated with the high layer, wherein the motion vector data associated with the high layer is based on motion vector data associated with the low layer.

36. A computer-readable medium as recited in claim 34, further comprising:
    selecting a motion vector coding mode with which to scalably generate the motion vector data associated with a portion of the video frame; and
    marking the portion of the video frame with an identifier of the selected motion vector coding mode.

37. A computer-readable medium as recited in claim 34, wherein the selecting is based on a rate-distortion optimization criterion.

38. A computer-readable medium as recited in claim 36, wherein the portion of the video frame is one of a macroblock, a block, or a sub-block.

39. A computer-readable medium as recited in claim 34, wherein generating motion vector data comprises coding motion vector data at an integer-pixel precision, half-pixel precision, or quarter-pixel precision.

40. A computer-readable medium as recited in claim 34, further comprising:
    calculating a cost associated with each of a plurality of motion vector coding modes;
    selecting a motion vector coding mode having least cost.

41. A computer-readable medium as recited in claim 34, wherein generating motion vector data comprises:
    coding a first motion vector at a coarse level; and
    coding a second motion vector at a fine level.

42. A computer-readable medium as recited in claim 34, further comprising transmitting the coded video frame.

43. A computer-readable medium as recited in claim 34, further comprising transmitting the coded video frame.

44. A computer-readable medium as recited in claim 34, wherein the determining comprises applying a function of the form:

$$\arg\min_i \{D_t(R - R_{Mi}) + D_{Mismatch}(M, M_i)\}, (1 \le i \le n)$$

wherein M represents a given motion vector, $M_i$ represents a motion vector encoded at an ith motion level, i represents one of n motion levels, R represent a bit rate associated with M, $R_{Mi}$ represents a bit rate associated with $M_i$, $D_t$ denotes a rate-distortion function, $D_{Mismatch}$ represents distortion caused by motion mismatch between M and $M_i$.

* * * * *